(12) United States Patent
Fateh

(10) Patent No.: US 10,679,422 B2
(45) Date of Patent: *Jun. 9, 2020

(54) METHOD AND APPARATUS FOR SELECTIVELY PRESENTING CONTENT

(71) Applicant: Atheer, Inc., Santa Clara, CA (US)

(72) Inventor: Sina Fateh, Mountain View, CA (US)

(73) Assignee: Atheer, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/243,458

(22) Filed: Jan. 9, 2019

(65) Prior Publication Data

US 2019/0147659 A1 May 16, 2019

Related U.S. Application Data

(63) Continuation of application No. 14/014,111, filed on Aug. 29, 2013, now Pat. No. 10,223,831.
(Continued)

(51) Int. Cl.
| | |
|---|---|
| *G09G 5/00* | (2006.01) |
| *G06T 19/00* | (2011.01) |
| *G02B 27/01* | (2006.01) |
| *G06T 11/20* | (2006.01) |
| *G06F 1/16* | (2006.01) |

(Continued)

(52) U.S. Cl.
CPC .......... *G06T 19/006* (2013.01); *G02B 27/017* (2013.01); *G06F 1/163* (2013.01); *G06F 3/011* (2013.01); *G06F 3/012* (2013.01); *G06F 3/013* (2013.01); *G06F 3/017* (2013.01); *G06F 3/033* (2013.01); *G06F 3/048* (2013.01); *G06T 1/00* (2013.01); *G06T 11/206* (2013.01); *G06T 11/60* (2013.01); *G09G 5/00* (2013.01); *G09G 5/005* (2013.01); *G02B 2027/014* (2013.01); *G02B 2027/0138* (2013.01); *G02B 2027/0178* (2013.01); *G02B 2027/0187* (2013.01); *G06F 2200/1637* (2013.01); *G09G 2320/0613* (2013.01); *G09G 2320/0686* (2013.01); *G09G 2340/14* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 5,546,099 A | 8/1996 | Quint et al. | |
| 6,144,755 A | 11/2000 | Niyogi et al. | |

(Continued)

*Primary Examiner* — Sultana M Zalalee
(74) *Attorney, Agent, or Firm* — Miller IP Law, LLC

(57) ABSTRACT

A method, system, apparatus, and/or device for displaying a portion of data so as to not obstruct a portion of a central visual field. The method, system, apparatus, and/or device may include a display configured to display data and a processing device coupled to the display. The processing device may be configured to determine a position of an eye of a viewer with respect to the display, define a first region of the display substantially corresponding with a peripheral vision field of the eye, define a second region of the display substantially corresponding with a central visual field of the eye, send a first portion of the data to be displayed at the first region, and send a second portion of the data to be displayed at the second output region such that a portion of the central visual field is unobstructed by the second portion of the data.

20 Claims, 22 Drawing Sheets

Related U.S. Application Data

(60) Provisional application No. 61/695,261, filed on Aug. 30, 2012.

(51) Int. Cl.
  G06F 3/01 (2006.01)
  G06F 3/048 (2013.01)
  G06T 1/00 (2006.01)
  G06T 11/60 (2006.01)
  G06F 3/033 (2013.01)

(56) References Cited

U.S. PATENT DOCUMENTS

| | | | |
|---|---|---|---|
| 7,940,285 B2 | 5/2011 | Would et al. | |
| 9,142,185 B2 * | 9/2015 | Fateh | G06T 11/206 |
| 9,665,987 B2 * | 5/2017 | Fateh | G06T 11/206 |
| 9,823,745 B1 * | 11/2017 | Fateh | G06F 3/013 |
| 10,147,232 B2 * | 12/2018 | Fateh | G06T 11/206 |
| 2002/0044152 A1 | 4/2002 | Abbott, III et al. | |
| 2002/0167461 A1 | 11/2002 | Bronson | |
| 2003/0234823 A1 | 12/2003 | Sato et al. | |
| 2004/0240709 A1 | 12/2004 | Shoemaker | |
| 2007/0057911 A1 | 3/2007 | Fateh | |
| 2008/0267447 A1 | 10/2008 | Kelusky et al. | |
| 2008/0297588 A1 | 12/2008 | Kurtz et al. | |
| 2009/0180071 A1 | 7/2009 | Fateh | |
| 2009/0189974 A1 | 7/2009 | Deering | |
| 2009/0309812 A1 | 12/2009 | Larson et al. | |
| 2010/0199230 A1 | 8/2010 | Latta et al. | |
| 2010/0214414 A1 | 8/2010 | Spruck | |
| 2011/0221656 A1 | 9/2011 | Haddick et al. | |
| 2012/0068913 A1 | 3/2012 | Bar-zeev et al. | |
| 2012/0113307 A1 | 5/2012 | Watanabe et al. | |
| 2012/0154277 A1 | 6/2012 | Bar-zeev et al. | |
| 2012/0218312 A1 | 8/2012 | Goldsmith et al. | |
| 2013/0101157 A1 | 4/2013 | Li et al. | |
| 2013/0208014 A1 | 8/2013 | Fleck et al. | |
| 2013/0336629 A1 | 12/2013 | Mulholland et al. | |
| 2014/0062865 A1 | 3/2014 | Fateh et al. | |
| 2017/0023793 A1 | 1/2017 | Shtukater | |
| 2017/0123215 A1 | 5/2017 | Li et al. | |

\* cited by examiner

METHOD AND APPARATUS FOR SELECTIVELY PRESENTING CONTENT

CROSS-REFERENCE TO RELATED APPLICATION

This application is a continuation of U.S. patent application Ser. No. 14/014,111, filed Aug. 29, 2013, which claims priority to benefit of U.S. Provisional Application No. 61/695,261, filed on Aug. 30, 2012, which are hereby incorporated by reference for all purposes.

BACKGROUND

In some instances, it may prove useful to output media content and other information in a "bulk" fashion. That is, a computer monitor, television, smartphone display, etc. displays images, text, and so forth in an essentially continuous and uniform fashion. So long as such a device is on, the device delivers data as that data is sent to the screen.

However, such bulk delivery of content can be problematic. For example, for a head-mounted display, it may be desirable under some circumstances to output at least certain types of data to the central visual field of a person wearing the display, so as to take advantage of the high visual acuity of the wearer's central vision. Yet, there are also circumstances under which outputting data to the wearer's central vision may cause difficulty, such as when a wearer of such a device is walking along a crowded sidewalk; in such case it might prove more advantageous to minimize or prevent obstructions to the wearer's central vision, so that the wearer may safely navigate through their environment.

There is a need for a simple, efficient method and apparatus for selectively and/or interactively presenting content.

BRIEF SUMMARY

The present invention contemplates a variety of systems, apparatus, methods, and paradigms for selectively presenting content.

In one embodiment of the present invention, a machine implemented method is provided that includes obtaining input data, generating output data from the input data, determining the status of a first contextual factor, and determining whether the status meets a first standard. If the status of the first contextual factor meets the first standard, applying a first transformation to said output data. The method includes outputting the output data to a viewer.

If the status of the first contextual factor does not meet the first standard, a second transformation may be applied to the output data.

The input data may be obtained from a sensor, a processor, a data store, and/or an external system.

The contextual factor me be a feature of the viewer. The contextual factor may be a posture of the viewer and/or a gesture of the viewer. The contextual factor may be a hand posture, an eye posture, a lip posture, a tongue posture, a jaw posture, a head posture, a body posture, a hand gesture, an eye gesture, a lip gesture, a tongue gesture, a jaw gesture, a head gesture, a body gesture, and/or a locomotion. The contextual factor may be a voice input, a key input, a mouse input, a stylus input, a joystick input, a touch input, a virtual interface input, and a brainwave sensor input.

The head gesture may include nodding, shaking, tilting, and facing in a direction. The head posture may include a directional facing. The eye gesture may include aligning the line of sight with at least a portion of the output data, aligning the line of sight with a real-world target, aligning the line of sight with a virtual reality target, and/or aligning the line of sight with an augmented reality target. The eye posture may include the line of sight being aligned with at least a portion of the first output data, the line of sight being aligned with a real-world target, the line of sight being aligned with a virtual reality target, and/or the line of being sight aligned with an augmented reality target.

The contextual factor may include the viewer sleeping, sitting, standing, walking, running, conversing, exercising, operating a vehicle, and/or operating machinery.

The contextual factor may be an environmental feature. The environmental feature may include the level of illumination, the color of illumination, the background brightness, the background color, the background motion, the location, the time, the date, an entity, an object, a phenomenon, and/or a surrounding.

The contextual factor may include sensor data, visual data, and/or biometric data. Sensor data may include accelerometer data, gyroscope data, compass data, GPS data, and differential GPS data.

Determining the status of the first contextual factor may include face recognition, object recognition, text recognition, and/or environmental recognition. Determining the status of the first contextual factor may include sensing a color transition, a brightness transition, a distance transition, and/or a focus transition.

The transformation may include at least partial determination of at least one output property of the output data.

The transformation may include defining at least a first output region and limiting the output of the output data thereto. The first transformation may include defining at least a first output region and excluding output of said output data therein. The first output region may correspond to a region of a visual field of the viewer. The output region may substantially correspond to the foveolar region, foveal region, macular region, central region, and/or peripheral region of the visual field of the viewer.

A first transformation may include defining a first output region and limiting the output of the output data thereto, with a second transformation including defining a second output region and limiting the output of the output data thereto. The first output region may substantially correspond to the central visual field of the viewer and substantially exclude the peripheral visual field of the viewer, and the second output region, may substantially correspond to the peripheral visual field of the viewer and substantially exclude the central visual field of the viewer.

The transformation may include a definition of a first subset of said output data with the output of the output data limited to the output of that first subset. The transformation may include defining first and second subsets of output data, defining first and second output regions, and limiting the output of the first and second subsets respectively thereto.

The transformation may include at least partial determination of the presence, location, size, abridgment, dimensionality, resolution, color, brightness, contrast, transparency, motion, speed, animation, and/or frame rate of the output data.

The output data may include text, graphics, images, video, and/or image augmentation. The output data may include sound.

The output data may include all of the input data, some of the input data, or none of the input data. The output data may be an empty set.

If the status of the first contextual factor does not meet the standard, generating the output data may include incorporating some but not all of said input data in said output data, with the first contextual factor including a head motion toward at least a portion of the output data as outputted, and the first transformation including incorporation of all of the input data in the output data.

The first contextual factor may include a head motion of the viewer, with the transformation including the definition of a first output region substantially excluding the central vision of the viewer, and with the output of the output data limited thereto.

The method may include determining the status of a second contextual factor, determining whether the status of the second contextual factor meets a second standard and if the second contextual factor meets the second standard applying a second transformation to the output data.

The first transformation may have priority over said second transformation such that if the first contextual factor meets the first standard and the second contextual factor meets the second standard then only the first transformation is applied to the output data. The first transformation may have priority over the second transformation such that if the first contextual factor meets the first standard and the second contextual factor meets the second standard then the second transformation is limited by the first transformation. The first transformation may have priority over the second transformation, such that if the first contextual factor meets the first standard and the second contextual factor meets the second standard then the second transformation is at least partially countered by the first transformation.

The first contextual factor may include a head motion substantially corresponding with locomotion of the viewer, with the first transformation including definition of a first output region substantially excluding the central vision of the viewer and limiting output of the output data thereto, and with the second transformation including definition of the first output region but substantially including the central vision of said viewer therein.

The second contextual factor may include an abrupt head motion not substantially corresponding with locomotion of the viewer, a substantially vertical head nodding motion not substantially corresponding with locomotion of the viewer, and/or a substantially horizontal head shaking motion not substantially corresponding with locomotion of the viewer.

The first contextual factor may include a head position of the viewer that substantially corresponds to a near-distance reading position, and the first transformation may include a definition of a first output region substantially below the horizon of the field of view of the viewer with the output of the output data limited thereto.

The method may include outputting the output data in a stereo format, with the first transformation including the definition of a natural convergence substantially corresponding to a natural reading position of the viewer with the output data displayed therewith.

The method may include outputting the output data in a region extending beyond the visual field of the viewer, such that the visual field of the viewer forms a window into the output data, and such that moving the visual field of the viewer substantially correspondingly moves the window relative to the output data.

The method may include outputting a marker substantially fixed relative to the visual field of said viewer, the marker moving substantially correspondingly with the visual field of the viewer. The marker may be a cursor.

In another embodiment of the present invention, an apparatus is provided that includes at least one sensor adapted to sense at least one contextual factor. The apparatus includes a processor in communication with the sensor, the processor being adapted to determine the status of the contextual factor, to determine if the contextual factor meets a standard, to generate output data from input data, and to apply a transformation to the output data if the contextual factor meets the standard. The apparatus also includes a display in communication with the processor, the display being adapted to output the output data to a viewer.

The contextual factor may include a feature of the viewer.

The sensor may include a position sensor, a motion sensor, and/or an acceleration sensor. The sensor may include an accelerometer, a gyroscope, a compass, a GPS sensor, and/or a differential GPS sensor. The sensor may include a camera. The sensor may include a biometric sensor.

The sensor may be adapted to receive at least a portion of the input data and to communicate the input data to the processor.

The apparatus may include a communicator in communication with the processor, the communicator being adapted to receive at least a portion of the input data and communicate the input data to the processor, and/or to receive at least a portion of the status of the contextual factor and communicate the contextual factor to the processor.

The apparatus may include a data store in communication with the processor, the data store being adapted to store at least a portion of the input data and communicate the input data to the processor, and/or to store at least a portion of the status of the contextual factor and communicate the contextual factor to the processor.

The processor may be adapted to generate at least a portion of the input data.

The display may be adapted to output the output data selectively to at least one region substantially corresponding to a visual region of the viewer. The region may include the foveolar visual region, the foveal visual region, the central visual region, the macular visual region, and/or the peripheral visual region of the viewer. The display may be adapted to output data selectively to exclude at least one region substantially corresponding to a visual region of the viewer. The region may include the foveolar visual region, the foveal visual region, the macular visual region, the central visual region, and/or the peripheral visual region of the viewer.

The display may be disposed in front of and proximate one or both eyes of the viewer. The display may be a stereo display.

In another embodiment of the present invention, a machine implemented method is provided that includes obtaining input data from a sensor, a processor, a data store, and/or an external system, and generating output data from the input data. The method includes determining with sensor data the status of a contextual factor that includes a feature of a viewer and determining whether the status of the contextual factor meets a standard. If the contextual factor meets the standard, a first transformation is applied to the output data, the first transformation including defining at least a first output region and excluding output of the output data therefrom, the first output region substantially corresponding to the foveolar region, foveal region, macular region, central region, and/or peripheral region of the visual field of the viewer. The method also includes outputting the output data to the viewer.

In another embodiment of the present invention, a head-mounted display is provided that includes a body adapted to be worn on the head of a viewer, and at least one sensor adapted to sense a contextual factor. The apparatus also includes a processor in communication with the sensor, the processor being adapted to determine the status of the contextual factor, to determine if the contextual factor meets a standard, to generate output data from input data, and to apply a transformation to the output data if the contextual factor meets said standard. The apparatus includes a display engaged with the body such that when the body is worn, the display is disposed proximate to and substantially aligned with one or both of the viewer's eyes, the display being in communication with the processor and being adapted to output the output data to the viewer.

The sensor may be engaged with the body. The processor may be engaged with the body.

In another embodiment of the present invention, a head-mounted display is provided that includes a body adapted to be worn on the head of the viewer, and a plurality of sensors engaged with the body and adapted to sense a plurality of contextual factors, the contextual factors including the position of at least a portion of the viewer, the motion of at least a portion of the viewer, the acceleration of at least a portion of said viewer, and an image having an imaging field of view substantially corresponding with the viewer's visual field. The apparatus includes a communicator engaged with the body and a data store engaged with the body. The apparatus also includes a processor engaged with the body and in communication with the sensors, the communicator, and the data store, the processor being adapted to determine the status of each contextual factor, to determine whether each contextual factor meets a standard therefor, to generate output data from input data from at least one of the sensors, the communicator, and/or the data store, and to apply a plurality of transformations corresponding to the contextual factors to the output data for each contextual factor that meets the standard therefor. The apparatus further includes a stereo display engaged with the body such that when the body is worn, the display is disposed in front of and proximate to the viewer's eyes, the display being in communication with the processor and being adapted to output the output data to the viewer. The stereo display is also adapted to output the output data selectively to at least a first region substantially corresponding to foveolar, foveal, central, macular, and/or peripheral visual region of the viewer. The stereo display is further adapted to output the output data selectively to exclude at least one region substantially corresponding the foveolar, foveal, central, macular, and peripheral visual region of the viewer.

In another embodiment of the present invention, an apparatus is provided that includes means for obtaining input data, means for determining a status of a contextual factor, means for determining whether the status of the contextual factor meets a standard, means for generating output data from the input data, means for applying a transformation to the output data if the contextual factor meets the first standard, and means for outputting the output data to a viewer.

In another embodiment of the present invention, a machine implemented method is provided that includes defining a contextual factor in a processor, defining a standard for the contextual factor in the processor, and defining a transformation in the processor. The method also includes instantiating in the processor-executable instructions for determining the status of the contextual factor, instantiating in the processor-executable instructions for obtaining input data, and instantiating in the processor executable instructions for generating output data from the input data. The method further includes instantiating in the processor-executable instructions for determining whether the status of the contextual factor meets the first standard, instantiating in the processor-executable instructions for applying the first transformation to the output data if the status of the first contextual factor meets the first standard, and instantiating in the processor-executable instructions for outputting the output data.

BRIEF DESCRIPTION OF THE DRAWINGS

Like reference numbers generally indicate corresponding elements in the figures.

DETAILED DESCRIPTION

Figure 1:
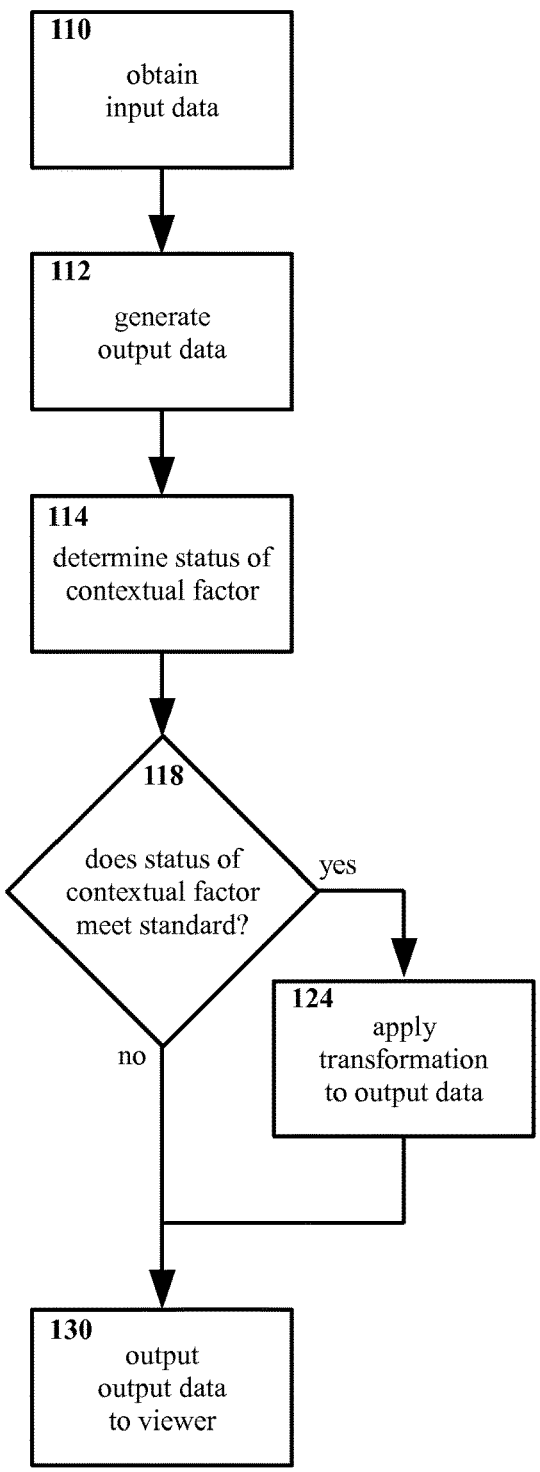
FIG. 1 shows an embodiment of a method for selectively outputting data to a viewer according to the present invention.

Referring to FIG. 1, an embodiment of a method according to the present invention for selectively outputting data to a viewer is shown therein. In the method as shown in FIG. 1, input data is obtained 110. A wide range of data may be suitable for utilization as input data, including but not limited to text, video, audio, and numerical data.

Output data is generated 112. Typically though not necessarily the output data is at least partially derived from and/or includes at least a portion of the input data. However, even when input data is a source for output data, information present in input data may be added, modified, and/or removed when generating output data 112. A wide variety of approaches, algorithms, etc. may be used to generate output data 112. The approaches, algorithms, etc. used to generate output data 112 may depend at least in part on the desired form and/or content of the output data. That is, whether or not the output data is or includes (for example) video data may at least partially determine the manner by which the output data is generated 112. In addition, where output data is generated from input data, the approaches, algorithms, etc. used to generate output data 112 therefrom may depend at least in part on the form and/or content of the input data. To continue the example above, whether the input data includes video data may at least partially determine the manner by which the output data is generated 112 from the input data.

Moving on in FIG. 1, a status of a contextual factor is determined 114. As applied to the present invention, contextual factors may vary greatly. Although particular embodiments may preferentially utilize one or more specific contextual factors, in general substantially any event, object, feature, etc. that may be sensed or otherwise evaluated may be utilized as a contextual factor for the present invention.

Consider a case wherein a person is viewing data on a processor-controlled head-mounted display device wherein the processor is executing the method as described herein.

In such a circumstance, one example of a contextual factor might be the locomotion (if any) of the viewer. Such a contextual might also be considered in a more detailed fashion, for example with regards to particular head motions and/or features thereof, which might be indicative of whether the viewer is walking, running, sitting, etc. Other contextual factors might include but are not limited to a viewer's body position, a location in real space (or an augmented space and/or a virtual space), conditions such as light level, the presence or absence of objects, persons, and/or phenomena, etc.

Determining the status of a contextual factor 114 thus might be expressed as a question, e.g. "does the viewer's head exhibit motions corresponding with the viewer walking?" A question addressing such a contextual factor also might be phrased more generally, e.g. "is the viewer walking?"

If determining the status of a contextual factor 114 may be considered as a question, the status itself of a contextual factor may be considered in the form of an answer to that question. For example, if the contextual factor is "viewer's locomotion", a status might be data regarding the motion of the viewer's head, the viewer's body as a whole, etc.

The present invention is not particularly limited with regard to the contextual factor, the status the contextual factor may have, or how that status is determined.

Returning to FIG. 1, a determination is made 118 as to whether the status of the contextual factor (as determined in step 114) meets a standard for that contextual factor. To continue the example above, if the contextual factor at issue is "viewer's locomotion", and the status of the contextual factor is in the form of data regarding the motion of the viewer's head and/or body, this standard might take the form of a series of guidelines representing motions that would be expected if the viewer were walking, running, etc. Standards may be simple, such as a fixed minimum value of acceleration or velocity, or relatively complex, such as a detailed set of criteria regarding directions of motion, amplitudes, patterns (if any), speeds and/or frequencies of motion, etc.

In addition, although a determination 118 may be binary as shown in FIG. 1—that is, the status of the contextual factor either meets or does not meet the standard—this is an example only. More nuanced determinations 118 may be made, using non-binary standards. For example, a standard might have several levels or degrees, such as an arrangement wherein a standard for acceleration has ranges for "no acceleration", "low acceleration", and "high acceleration", potentially with different transformations and/or other outcomes associated with each level. Other arrangements, including but not limited to standards that define continuous ranges as opposed to discrete levels also may be suitable.

Alternatively, multiple standards may be used in combination with multiple transformations. That is, a single contextual factor may be compared against two or more standards, with each standard potentially leading to a distinct transformation.

Moreover, a transformation may be based at least in part and/or otherwise take into consideration the status and/or value of the contextual factor. For example, a transformation relating to a minimum level of acceleration may include the value, direction, etc. as measured (or otherwise determined) for the acceleration as part of an algorithm used to carry out the transformation.

Briefly, then, a contextual factor is a feature to be evaluated; the status of the contextual factor is information describing some or all of the state of that feature, and the standard is a guideline (simple or complex) against which that information may be compared.

The contextual factor, the status thereof, the standard for comparison, and the manners by which the status is determined and compared, may all vary considerably from one embodiment to another. The particulars thereof may depend at least partly on the details of each specific embodiment. These matters are addressed in more detail subsequently herein.

If the determination 118 is negative—the status of the contextual factor does not meet the standard therefor—then the method proceeds to output the output data 130. In the head-mounted display used as an example above, the output data might be displayed to the viewer on a screen or screens.

On the other hand, if the determination 118 is positive—the status of the contextual factor does meet the standard—then the method proceeds to apply a transformation to the output data 124. The present invention is not particularly limited with regard to the transformation. Transformations might include, but are not limited to, changes to and/or restrictions on where data is displayed, how much (if any) data is displayed, the form in which data is displayed (e.g. text, graphical icons, still images, video, audio, etc.), and the appearance of the data (color, size, resolution, frame rate of animation, etc.).

Subsequent to application of the transformation 124, the now-transformed output data is outputted to the viewer 130.

Figure 2:
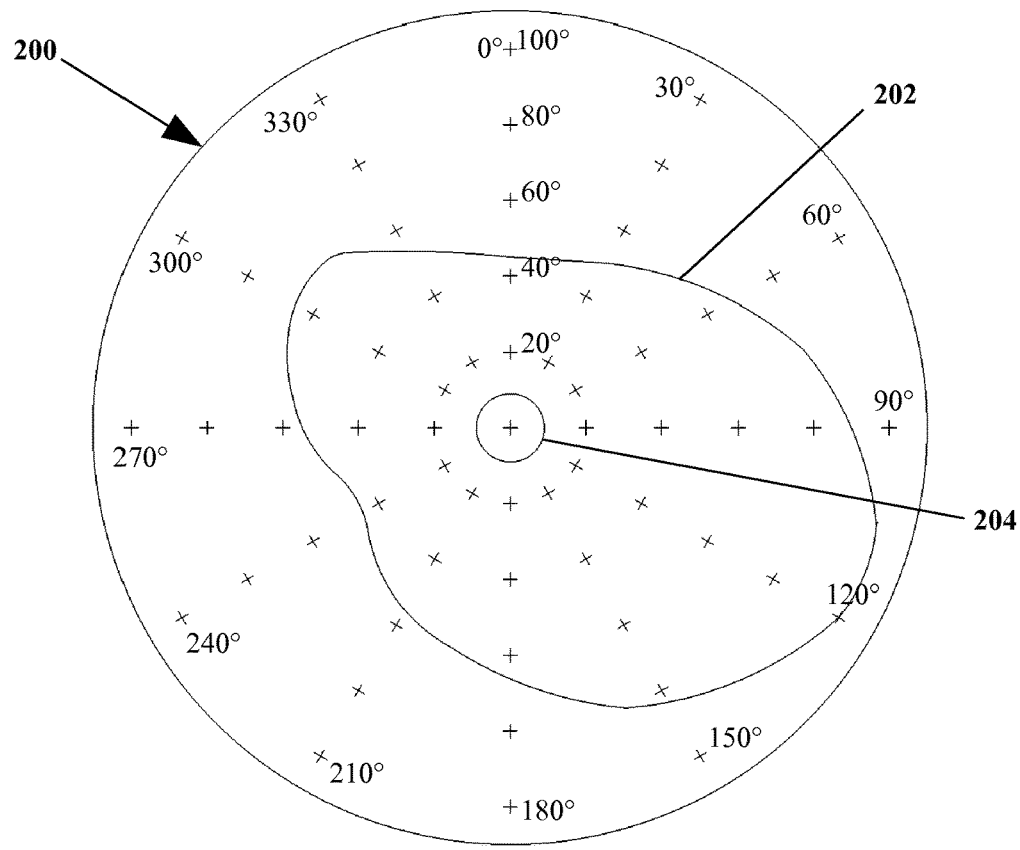
FIG. 2 shows a visual map of a typical human eye including peripheral and central vision.
Figure 3:
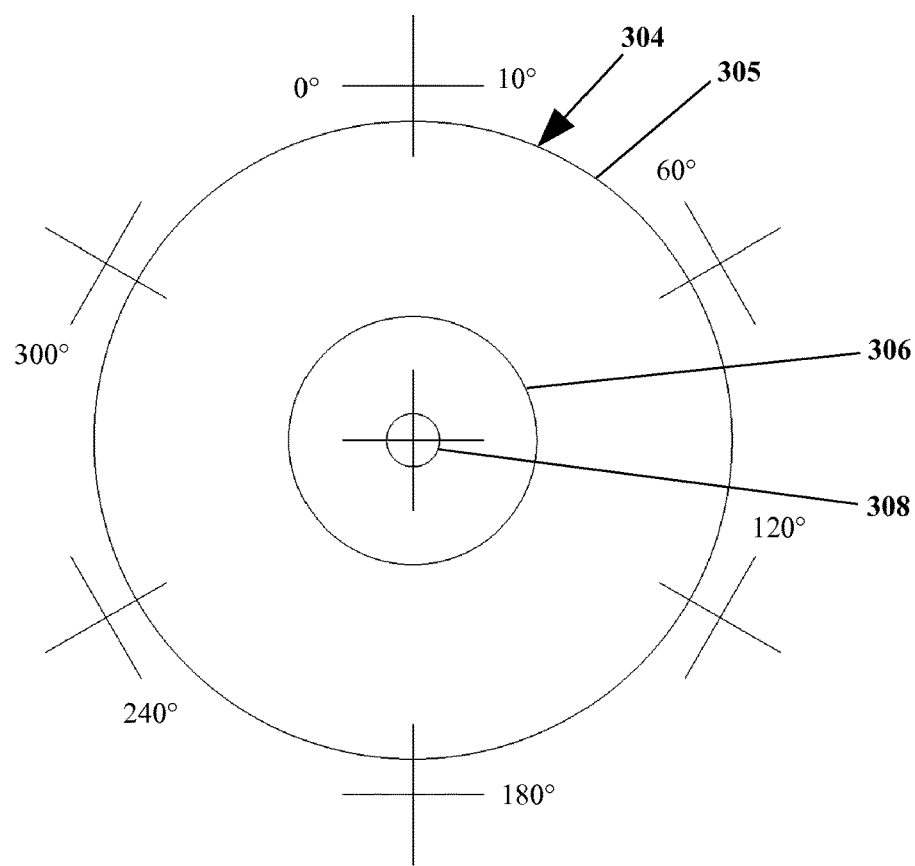
FIG. 3 shows a partial visual map of a typical human eye including macular, foveal, and foveolar vision.
Figure 4:
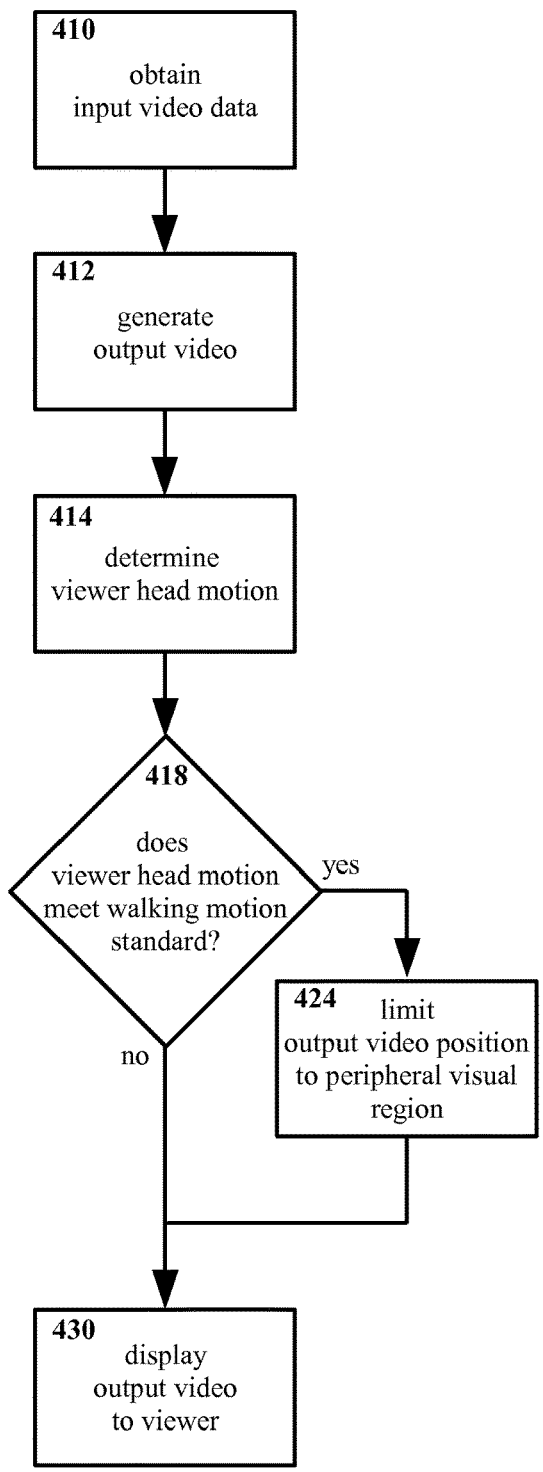
FIG. 4 shows another embodiment of a method for selectively outputting data to a viewer according to the present invention.

Further and more detailed discussion follows regarding several of the aforementioned features. However, for the sake of clarity, a more concrete example of a method according to the present invention will first be presented with reference to FIG. 2, FIG. 3, and FIG. 4. FIG. 2 and FIG. 3 illustrate portions of a human visual field, while FIG. 4 shows an example method according to the present invention for selectively outputting data to different portions of a human visual field.

With reference to FIG. 2, therein a visual map 200 is presented showing visual fields typical for the right eye of a human. Hash marks at different radial distances correspond to angles from the normal, e.g. 20 degrees offset, 40 degrees offset, etc. Hash marks around the periphery of FIG. 2 correspond to angles from the vertical.

The outline identified as 202 in FIG. 2 corresponds approximately to a human's peripheral visual field. The outline identified as 204 in FIG. 2 corresponds approximately to a human's central visual field.

The human peripheral visual field 202 is of uneven shape, and covers a relatively large area, with a radial extent of as much as 120 degrees or more in some areas as may be seen in FIG. 2. Within the area of the peripheral visual field 202, spatial resolution is low and color discrimination is poor or even nonexistent. However, vision at low light levels is good, and motion detection is excellent.

By contrast, the human central visual field 204 is roughly circular but has a radial extent of only about 9 degrees (or a diameter of about 18 degrees). In terms of physical dimensions within the eye, the region of the retina that generates the central visual field 204 is approximately 5 mm in diameter. Within the central visual field 204, spatial resolution is high and color resolution is good. However, as noted the total area of the central visual field is relatively small. While humans generally perceive their vision as having high resolution over a wide area, this is, for the most part, an illusion generated by the brain; in fact, high-resolution image data (and good color data) are available only in a small portion of the human visual field.

As may be seen in FIG. 3 the central visual field 304 may, in turn, be further subdivided. The outermost portion of the central visual field 304 is referred to as the macular vision 305; macular vision has a radial extent of about 9 degrees and is generated by a region of the retina (the macula) approximately 5 mm across. Moving inward, the foveal visual field 306 has a radial extent of about 3.5 degrees and is generated by a region of the retina (the fovea) approximately 1.5 mm across. Finally, the foveolar visual field 308 has a radial extent of only about 0.75 degrees and is generated by a region of the retina (the foveola) approximately 0.35 mm across.

The macular visual region 305, foveal visual region 306, and foveolar visual region 308 respectively have progressively higher spatial resolution and improved color discrimination. That is, the highest level of spatial resolution and color discrimination in human vision is found in the foveolar visual region 308, corresponding to the centermost portion of the visual field.

Turning now to FIG. 4, a method according to the present invention is shown therein for selectively outputting data to different portions of a human visual field. The method of FIG. 4 is at least somewhat similar to that shown in FIG. 1, however the method in FIG. 4 is more specific to a particular embodiment. Namely, the example method in FIG. 4 relates to displaying video in different areas of a viewer's visual field based on a determination of whether the viewer is walking. Such a method might be employed, for example, in conjunction with the use of a head-mounted display worn by the viewer. However, it is emphasized that this is an example only, presented for illustrative purposes and that the present invention is not limited to the specifics of the embodiment shown in FIG. 4.

In the method as shown in FIG. 4, input video data is obtained 410. This corresponds generally to the input data obtained in step 110 of FIG. 1, but for the example of FIG. 4, the input data is specific data for displaying a video, i.e. video frames, video encoding information, audio tracks, etc.

Output video is generated 412 from the input video data. The generation of output video 412 from input video data is at least somewhat comparable to the generation of output data 112 in FIG. 1. Output video may be considered to be one possible example of output data (though output data for the present invention is not limited only to video).

The viewer's head motion is determined 414. That is, some or all of the motions of the viewer's head are determined e.g. using gyroscopes and accelerometers or through some other approach. The determination of the status of the viewer's head motion 414 is at least somewhat comparable to the determination of the status of a contextual factor 114 in FIG. 1. Specifically, a viewer's head motion may be considered to be the status of a contextual factor (though by no means the only possible contextual factor or status thereof) for the particular example embodiment shown in FIG. 4.

Moving on in FIG. 4, a determination is made 418 as to whether the status of the viewer's head motion matches a walking motion standard. That is, is the viewer's head moving, and if so does that movement correspond with a standard representative of motions by a viewer walking? For example, a walking viewer might be expected to exhibit specific frequencies and amplitudes of head motion, and/or other recognizable patterns or properties of motion, which might be used to define a standard by which make the determination 418. The determination 418 as to whether the status of the viewer's head motion meets a standard is at least somewhat comparable to the determination 118 of whether the status of a contextual factor meets a standard in FIG. 1.

If the viewer's head motion is determined 418 not to match the standard therefor, the method proceeds display the output video to the viewer 430. This is at least somewhat comparable to outputting the output data 130 in FIG. 1, in that displaying output video 430 may be considered an example of outputting output data 130.

On the other hand, if the determination 418 is positive—if the viewer's head motion does meet the standard therefor—then the method limits the position in which the output video is displayed to the viewer to only the viewer's peripheral vision 424. This is at least somewhat similar to the step of applying a transformation to output data 124 in FIG. 1, in that limiting the position of output video may be considered as an example of a transformation applied to output data. However, the present invention is not limited only to spatial limits as transformations.

With the positioning limit applied 424, the output video is displayed to the viewer 430. More particularly, given the positioning limit of step 424 the output video, the output video is displayed 430 only to the peripheral visual region of the viewer.

In sum, in the example method shown in FIG. 4, if the viewer is walking, then video output is limited to the viewer's peripheral vision, leaving the viewer's central visual field clear to navigate, deal with obstacles, etc.

As noted earlier, an additional discussion may be warranted with regard to several features of the present invention as introduced in FIG. 1.

With reference to step 110 in FIG. 1, further discussion is herein presented regarding input data in the context of the present invention.

A wide variety of input data may be suitable for use with the present invention, and the present invention is not particularly limited with regard thereto. Input data may include, but is not limited to, text, graphics, images, videos, models and/or other constructs, metadata related to any of the preceding or to other data, executable instructions and/or programs composed thereof, and numerical data. In addition, nonvisual data may be suitable for use as input data for at least some embodiments of the present invention, including but not limited to audio data.

Similarly, the present invention is not particularly limited with regard to how and/or from what source(s) input data is acquired. Input data may, for example, be obtained from one or more sensors, e.g. sensors in communication with a processor that is executing the machine-controlled method of the present invention. A wide range of sensors may be suitable. Where sensors are used to generate input data, the particular sensors used to generate the input data for a given embodiment may depend at least in part on the contextual factor(s) under consideration, i.e. the object, phenomenon, etc. on which the sensors gather information. For example, for an embodiment wherein the contextual factor is or relates to motion of a viewer's body, sensors for determining position, motion, and/or acceleration might be utilized. Other arrangements may be equally suitable.

As described in more detail elsewhere herein, sensors may also be used to determine the status of contextual factors. It is noted that sensors, when present, may obtain either or both input data and status information regarding contextual factors. Any particular sensor may, but is not required to, provide both types of data. For example, an imaging sensor might acquire images of a viewer's physical surroundings for use as input data, and also acquire information regarding the viewer's own motions if those motions are to be utilized as a contextual factor (e.g. by observing the apparent motion of objects within the imager's field of view). However, this is an example only and is not required, and other arrangements also might be equally suitable.

Still with reference to step 110 in FIG. 1, in addition to or instead of obtaining input data from sensors, input data may be generated within a processor that is implementing the machine-controlled method. Input data might also be obtained from a data store in communication with the processor, or from an external system (e.g. by wired or wireless communication). Input data may come from alternative and/or additional sources, as well.

With reference now to step 112 in FIG. 1, further discussion is herein presented regarding output data in the context of the present invention.

The present invention generates a wide variety of output data, and the present invention is not particularly limited with regard thereto. Output data may include, but are not limited to, text, graphics, images, videos, models and/or other constructs, metadata related to any of the preceding or to other data, executable instructions and/or programs composed thereof, and numerical data. In addition, nonvisual data may be suitable for use as output data for at least some embodiments of the present invention, including but not limited to audio data.

Likewise, the present invention is not particularly limited with regard to how output data is generated. A wide variety of algorithms, processing approaches, etc. may be suitable for use in generating output data according to the present invention. The particular algorithms, processing approaches, etc. may depend at least to some degree on the contextual factor(s) and standards therefor; for a binary standard (e.g. yes/no) for example, a simple algorithm may be suitable, while for a standard that providing subtle and sophisticated guidelines regarding complex motions a relatively complicated algorithm might be suitable.

In addition, for some embodiments, it may be sufficient to use the input data directly as the output data, without alteration. Processing to make changes to the input data to generate the output data, while not precluded, also is not required. Thus for some embodiments under at least some conditions, the input data and output data may be identical or substantially identical.

Similarly, the present invention is not particularly limited with regard to how and/or to what destination(s) output data is outputted (with reference to step 130 in FIG. 1). Output data may be outputted to one or more visual displays, such as visual displays in head-mounted displays and other wearable devices, but this is an example only and other arrangements may be equally suitable. A wide range of output devices may be suitable, and the particular form(s) and content of the output data for a given embodiment may depend at least in part on the output device(s) utilized therewith.

Furthermore, output data for the present invention is not necessarily static in nature. That is, it may be possible for at least some embodiments to generate output data with or without applying a transformation (depending on whether or not the status of any relevant contextual factors matches the appropriate standards therefor), and then, if the status of the relevant contextual factors is determined to change, to likewise apply different transformations to the output data.

For example, consider an arrangement wherein a contextual factor relates to whether or not a viewer's line of sight is aligned with output data being outputted to that viewer. Initially, until output data is first outputted the viewer might not be looking in an appropriate direction (since the output data would not yet be present). However, once the output data were outputted, and the viewer aligned his or her line of sight with the output data, the status of the contextual factor would change, which in turn could invoke a transformation to the output data. More particularly, in terms of the appearance to the viewer, output data might be displayed initially in an abbreviated form, with the output data then expanding to show more information when the viewer shifts his or her eyes to focus on the output data.

With reference now to steps 114 and 118 in FIG. 1, further discussion is herein presented regarding contextual factors, the status of contextual factors, and standards therefor in the context of the present invention.

Contextual factors, the status thereof, and standards therefor are interrelated. In brief, a contextual factor is a parameter to be considered; the status of the contextual factor is information describing some or all of the state of that parameter, and the standard is a guideline against which that information may be compared. For example, a contextual factor might be "motion of a person viewing output from a head-mounted display", with the status of that contextual factor being the actual motion exhibited by that viewer, and the standard being some description of motion against which the actual motion may be compared.

Contextual factors for the present invention may vary greatly, and the present invention is not particularly limited with regard thereto. Broadly speaking, a contextual factor for the present invention may be substantially any feature that can be usefully sensed, measured or otherwise have a status thereof determined, and for which that status can be compared to a standard, so as to inform whether or not a transformation of output data is to be invoked.

Contextual factors, statuses, and standards may be simple or complex. For example, a contextual factor relating to light levels might be as simple as "light intensity", but might also more sophisticated, e.g. "cyclical variation in light intensity over time". In addition, contextual factors, statuses, and standards may consider multiple values, e.g. a contextual factor may consider both light level and light color, both light level and motion of a viewer, etc. with statuses and standards being similarly multi-value.

Contextual factors and standards may be viewer defined, may be processor defined, may be externally defined, and/or may be predefined. Contextual factors and standards may also be adaptive. That is, contextual factors, statuses, and standards may themselves vary, e.g. in response to viewer inputs, processor action, environmental cues, etc. Contextual statuses, by contrast, typically are measured, read from storage, or otherwise determined as factual information, rather than being defined.

A minimum of one contextual factor, one status, and one standard are required for the present invention. However, there is no upper limiting number of contextual factors, statuses, and/or standards. In practice, the number considered for at least some embodiments may be extremely large. In addition, a single contextual factor, status, and/or standard may invoke one or more transformations, and a single transformation may conversely be invoked by more than one contextual factor, status, and/or standard. While one-to-one correspondence is not prohibited, neither is one-to-one correspondence required.

Still with reference to steps 114 and 118 in FIG. 1, the manner by which the contextual factors and/or standards are defined or otherwise determined is not particularly limited. Likewise, the manner by which the status is measured or otherwise determined is not particularly limited. Further, the manner by which the status is determined to match or not match the standard is not particularly limited. Algorithms, approaches, etc. for the aforementioned actions may be simple or complex, may be viewer determined or otherwise determined, and may be fixed or adaptive. Specific algorithms, approaches, etc. for a particular embodiment may depend to at least some degree on the details of the contextual factors, statuses, and standards for that particular embodiment.

As previously noted with regard to input data, contextual feature status may be obtained as sensor data. In particular, for some embodiments, some or all sensor data for input data and some or all sensor data for determining contextual status may come from one or more common sensors. That is, a single sensor may provide input data and/or contextual status data.

As has been described, contextual factors, statuses, and standards are interrelated. For purposes of simplicity in describing variations and permutations therein, the term "contextual factor" is used to collectively represent these related concepts. It should be understood that reference to a contextual factor related to, for example, biometric features and/or information, in turn, implies a status that is likewise relevant to biometric information, and a standard that similarly relates to biometric features and/or information.

Contextual factors may vary greatly from one embodiment to another.

For at least some embodiments of the present invention, it may be useful to utilize contextual factors that relate to a viewer of the output data, and/or that represent some feature of that viewer.

More particularly, for at least some embodiments of the present invention, it may be useful to utilize one or more postures and/or gestures of the viewer as a contextual factor. As used with reference to the present invention a posture is a substantially static position, orientation, configuration, etc. of a viewer or a portion thereof, while a gesture is a substantially active change in position, orientation, configuration, etc. of a viewer or a portion thereof.

For example, a contextual factor might be a hand posture and/or gesture by the viewer. As indicated previously, contextual factors may be simple or complex. Thus utilizing a hand posture or gesture as a contextual factor might constitute simply determining whether a viewer's hand is present (and in the case of a gesture, moving), e.g. in the field of view of a camera. However, the contextual factor could be more specific, such as determining whether a viewer's hand is present (and/or moving) at a certain location, with a certain orientation, a certain configuration (e.g. fingers bent, fingers spread, etc.).

Continuing with regard to steps 114 and 118 in FIG. 1, it is noted that the present invention does not necessarily require a distinction between contextual factors satisfied through a knowing and deliberate action on the part of a viewer and contextual factors satisfied without the viewer necessarily intending or even being aware of satisfying a contextual factor. To continue the example of hand postures and gestures, a deliberate hand posture or gesture might be executed by a viewer as a form of command or input (i.e. to the processor executing the method). By contrast, viewers may execute natural postures and/or gestures without consideration or even awareness of the use of those postures and/or gestures as contextual factors. Thus, while certain contextual factors may be selected so as to facilitate deliberate inputs or commands by a viewer (e.g. to execute a particular transformation), other contextual factors may be selected so as to invoke transformations that are, from the standpoint of the viewer, transparent and automatic.

Thus, while certain contextual factors in the present invention may for certain embodiments represent a command, contextual factors are not required to be commands. In particular, it is emphasized that the use of a viewer features and other viewer-controlled contextual factors is an example only, and that the present invention is not limited thereto. Contextual features are possible that do not involve viewers and/or that cannot be directly controlled by viewers, such as local temperature, light levels, time of day, etc.

Still with regard to steps 114 and 118 in FIG. 1, a variety of postures and gestures may be suitable for use as contextual factors. Suitable gestures and postures include, but are not limited to, eye postures and gestures, lip, jaw, and/or tongue postures and gestures, head postures and gestures, and overall body postures and gestures. In particular, postures and/or gestures indicative and/or suggestive of some other viewer action (perhaps one not immediately observed) may be utilized as contextual factors.

For example, lip, jaw, and/or tongue postures and gestures may be considered as contextual factors in their own right. However, certain lip, jaw, and/or tongue postures and gestures also may be considered to be indicative of a viewer conversing, and/or subvocalizing. For some embodiments, it may be sufficient to sense and consider as contextual factors such as a lip, jaw, and/or tongue postures and gestures, without consideration as to whether speech etc. is occurring. However, for other embodiments it may be desirable to sense lip, jaw, and/or tongue postures and gestures so as to determine therefrom whether a viewer is speaking, and/or what he or she is saying if so. While such determination is not required, neither is such determination prohibited. Either or both of the postures and/or gestures themselves and/or the speech (if any) associated therewith may be utilized as contextual factors for the present invention.

Other head postures and/or gestures suitable for use as contextual factors include, but are not limited to, nodding, shaking, and/or tilting of the head, and/or moving to, moving from, moving through, and/or being aligned with a directional facing. More particularly with regard to directional facings, directional facings may include but are not limited to head positions substantially corresponding with a near-distance reading position.

Similarly, eye alignment and/or eye movement may be considered as contextual factors. A viewer aligning his or her line of sight, and/or moving his or her line of sight, may be indicative of the viewer looking at some target within the viewer's visual field such as an object, feature, etc. It may not be necessary to verify directly that a viewer is indeed looking at a particular object; for at least certain arrangements it may be suitable to track the position and/or motion of the viewer's eyes, for example, and infer the viewing of a particular target based on the direction(s) in which the viewer is looking. However, otherwise determining or verifying that the viewer is indeed looking at a target (e.g. though sensing degree/distance of eye focus, monitoring brainwaves, imaging and recognizing objects within the viewer's field of view, etc.).

Suitable eye postures include, but are not limited to, the viewer's line of sight being aligned with the output data (or some portion thereof), the viewer's line of sight being aligned with a real-world target, the viewer's line of sight being aligned with a virtual reality target, and the viewer's line of sight being aligned with an augmented reality target. Similarly, suitable eye gestures include but are not limited to aligning the viewer's line of sight with the output data (or some portion thereof), aligning the viewer's line of sight with a real-world target, aligning the viewer's line of sight with a virtual reality target, and aligning the viewer's line of sight with an augmented reality target.

Likewise, postures and/or gestures using other body parts and/or a body as a whole may be utilized as contextual factors.

Continuing with regard to steps 114 and 118 in FIG. 1, although the preceding may refer (at least in places) to contextual factors on a level of individual gestures, it is noted that contextual factors for the present invention, including but not limited to contextual factors associated with viewer features such as postures and gestures, may be considered at varying "levels". For example, a relatively low-level contextual factor might be represented by a characterization of certain specific acceleration and gyroscopic parameters for a viewer's head. A higher-level contextual factor might be represented by a determination of whether a viewer's head may be considered to be moving in such a fashion as to correspond with that viewer walking and/or running. A yet higher-level contextual factor might simply be a question of whether the viewer is walking/running or not. In practice, a contextual factor such as "viewer walking/running" may be implemented as one or more lower level contextual factors, e.g. gyroscope and accelerometer data. Nevertheless, in instances where contextual factors may be implemented at high levels, doing so is not prohibited. For purposes of clarity, contextual factors as discussed herein may be presented as only a single level. However, description of contextual factors at one level (whether high, low, or otherwise) should not be interpreted as a requirement to implement that contextual factor or any contextual factor at such a level, nor should such description be interpreted as a suggestion that either contextual factors generally or any particular contextual factor is limited to high levels, low levels, or otherwise.

Thus, while it may be suitable to consider specific motions and/or positions of arms, legs, head, etc. (and/or combinations thereof) as contextual factors, it may also be equally suitable to consider as contextual factors such higher-level notions as whether a viewer is sitting, standing, walking, running, conversing, exercising, operating a vehicle, operating machinery, etc.

Again with regard to steps 114 and 118 in FIG. 1, insofar as determining the status of a particular contextual factor, data may be, but is not required to be, relatively low-level in nature. In practice sensors available for obtaining status data tend to generate relatively low-level data. For example, even if the high-level contextual factor under consideration is "is the viewer walking?" the actual status data may not be of a form "yes/no", but rather may be of the form of visual data (e.g. from a camera, whether facing the viewer or otherwise), biometric data, accelerometer data, gyroscope data, compass data, GPS or differential GPS data, etc. To consider a slightly higher level, data might be in the form of position information, motion information, acceleration information, etc. The "yes/no" status may then be determined from such lower-level sensor data and/or such mid-level data, e.g. by analysis of the data using executable instructions instantiated on the processor that is executing the method. However, this is an example only, and obtaining high-level status information is not prohibited.

While processing of sensor and/or other data to determine the status of a contextual factor is not required, for at least certain embodiments such processing may be useful. For example, data from an imaging sensor, or image data obtained otherwise, may be evaluated in terms of recognizable content therein. For example, for a contextual factor along the lines of "is another person present?", evaluating an image using a facial recognition algorithm might prove useful in determining whether a face (and thus potentially a person) might be present. Likewise, object recognition might be utilized to assist in determining the presence of objects relevant to a contextual factor. Text recognition also may be useful in evaluating contextual factors for at least some embodiments, since textual cues are frequently widespread and may be informative either directly and/or indirectly. For example, a sign reading "East 46th Street" might be directly indicative of location (i.e. the viewer is at/near East 46th Street), while "artichokes 3 for $1" might indirectly (but still potentially usefully) suggest without necessarily directly identifying a location (i.e. at a grocery store or other location where artichokes might be for sale). Likewise, overall environmental identification might entail the identification of multiple objects, entities, and/or individuals, patterns of landscapes or cityscapes, etc.

Further with regard to steps 114 and 118 in FIG. 1, just as the present invention is not particularly limited with regard to the contextual factors that may be utilized, the present invention also is not particularly limited with regard to the information that may be obtained and/or used to determine the status of contextual factors.

As already noted information regarding motion may be gathered; a range of such data may be gathered. Motion information regarding the viewer may, for example, be determined by sensing or otherwise obtaining data on position, velocity, acceleration, orientation, etc. Suitable instruments for gathering such data include but are not limited to accelerometers, gyroscopes, compasses, GPS sensors, and differential GPS sensors. In addition, motion data might be obtained in other ways, e.g. by considering image data and determining the motion of the viewer and/or other entities (such as people, objects, etc. in the images) based on position, real and/or apparent motion within the images, etc. In such instances, images might be obtained either with or without the viewer therein. For example, to determine the motion of a viewer's eyes, hands, mouth, etc. from images it may be useful for those images to include the viewer's eyes, hands, mouth, etc. within the images, e.g. using an inward-facing camera. Alternatively, to determine whether a viewer's head or body is moving might be accomplished e.g. with an outward facing camera so as to sense motion in the changes in the images over time as the viewer's head, body, etc. moves relative to the external world. These are examples only, and other arrangements may be equally suitable.

Likewise, a range of biometric information may be gathered for use as and/or in support of contextual factors. Biometric information that may be suitable includes but is not limited to heart rate, heartbeat waveform, blood pressure, electrical and/or magnetic signals in the heart, brain, individual muscles, and/or body as a whole, skin conductivity, pH, blood chemistry, exhalation chemistry, skin coloration (whether in visible light or otherwise), respiration rate, respiration waveform, oxygen saturation, electrocardiography, magnetocardiography, electroencephalography, magnetoencephalography, and pupil dilation. Data may be gathered with and/or without direct contact with an individual and is not limited either to human subjects or to the viewer(s) (if any) to whom the data is outputted.

As previously noted, some or all phenomena considered as contextual factors may be evaluated by evaluating higher and/or lower level phenomena, e.g. determining whether a viewer is walking based on head acceleration, electrical signals in muscles, brainwaves, real/apparent motion in images, etc.

Similarly, a range of deliberate human activities may be considered as and/or in support of contextual factors. For example, activities executed by the viewer may be utilized as contextual factors (though activities by others also may be used in addition/instead). Activities that may be considered as contextual factors include, but are not limited to, sleeping, sitting, standing, walking, running, conversing, exercising, operating a vehicle, and operating machinery.

Continuing with regard to steps 114 and 118 in FIG. 1, it is noted that contextual factors are not particularly limited with regard to the use of tools, implements, hardware, etc. In particular, the use of an input device may be utilized as a contextual factor. As has been previously noted contextual factors are not particularly limited with regard to the presence or absence of intent to generate and/or transmit information. Thus although the intent is not required for contextual factors to be utilized as input, deliberate efforts to send input such as using an input device also is permissible. Deliberate inputs that may be suitable for use as contextual factors include but are not limited to key inputs, mouse inputs, stylus inputs, joystick inputs, a touch inputs, virtual interface inputs (i.e. utilizing an interface that exists as a virtual construct but not necessarily as a physical construct), and brainwave sensor inputs.

Furthermore, phenomena that mimic but do not necessarily constitute other phenomena may themselves be used as contextual factors. For example, substantially silent positions and/or motions of lips, jaw, tongue etc. including but not limited to positions and motions substantially corresponding to speech may be considered as contextual factors for the present invention. Similarly, hand gestures having the appearance of using a device such as typing on a non-existent keyboard (and/or a non-physical virtual keyboard), swinging a non-existent hammer, etc. may be utilized as contextual factors. For example, a method according to the present invention might use motions indicative of typing as a contextual factor, and limit display of other information in the viewer's central vision while the viewer is executing such motions.

Moreover, as noted briefly earlier herein, contextual factors are not required to include input (conscious or otherwise) from a viewer or viewer at all. For example, an environmental condition might be used as a contextual factor.

More particularly, levels of illumination might be utilized as a contextual factor, for example, to determine whether to invoke a transformation of the brightness of displayed data (though other transformations might also be equally suitable). Other environment conditions suitable for use as contextual factors include, but are not limited to, color of illumination (and/or the bit depth of the color), the overall brightness and/or color of an area or background, sound levels, temperature, humidity, wind direction and speed (if any), and the presence of smoke, rain or other environmental phenomena.

In addition, for at least certain embodiments various abstract notions such location may be considered as contextual factors. Such factors may be considered in absolute terms such as (for location) latitude, longitude, elevation, etc., or in relative terms such as distance and direction from some reference point. Likewise, a location that is indexed but not necessarily dimensional may be utilized, e.g. a street address may be sufficient in at least some instances to specify a location even without dimensional position information. Absolute or relative time (e.g. time measured from some reference), including but not limited to clock time, date, day of the week, year, etc. may also be used as a contextual factor. Other abstract factors also may be equally suitable.

Still with regard to steps 114 and 118 in FIG. 1, objects and entities other than a viewer and/or viewer may be utilized as contextual factors. That is, the presence, absence, position, condition, number, behavior, etc. of objects, animals, plants, etc. may be so utilized. For example, the presence, absence, etc. of a wrench might be utilized as a contextual factor. At a relatively low level, such a contextual factor might simply relate to "is such a tool present", but higher level considerations may also utilize a similar contextual factor, e.g. "where is the viewer/device/etc.?" In such circumstances, a contextual factor regarding the presence of a wrench might be considered in determining location, insofar as a wrench may reasonably be considered to correlate with a hardware store, construction site, etc., but may be considered less likely to correlate with a library or movie theater.

Even where contextual factors are concerned with the presence, arrangement, etc. of objects, persons, etc., contextual factors are not limited to only one object, person, etc. To continue the example above, a high-level contextual factor of "is the viewer in a hardware store" might be considered in terms of a lower-level contextual factor of "are there multiple wrenches in proximity to one another". More generally, arrangements, behaviors, etc. of many individual features may be considered collectively as contextual factors. Such collective combinations of arrangements, behaviors, etc. might be referred to as a "surrounding". Numerous possible surroundings may be suitable for use as contextual factors. To continue the previous example, a hardware store might be considered to be represented by surroundings that might be visible to a person therein, such as tools, other products, shelves, etc., perhaps with the additional qualification that such features are disposed in some particular arrangement (or in one of a range of possible arrangements). Potentially, very high-level and/or broad contextual factors such as "where is the viewer" might take into consideration a wide range of features, such as local objects nearby, overall coloring, geometries such as building layout or skyline, and/or other information. Such arrangements might enable determinations regarding contextual factors such as "is the viewer at work?", "is the viewer at home?", "is the viewer in a vehicle?", etc.

Continuing with regard to steps 114 and 118 in FIG. 1, as previously noted viewer actions, behavior, etc. may be considered as contextual factors. Likewise, actions, behavior, etc. of other persons, animals, etc. For example, the presence of a vehicle with a flashing emergency light (police car, fire truck, etc.) might be used as a contextual factor to invoke limiting or otherwise altering the output of a head-mounted display or other device, e.g. so as to alert a viewer to a potential hazard or emergency, to enable the viewer to more effectively respond thereto (for example by leaving the viewer's central vision unobstructed), etc. Similarly, "another person speaking" might be utilized as a contextual factor, along with a wide range of actions, behaviors, etc. by others.

It will be understood that for a given contextual factor, the nature of the contextual factor will determine at least in part the type of data that is necessary to determine the status thereof, and thus will determine at least in part the type of sensors (if any) to be used for determining that status. Thus, a contextual factor depending on light levels might utilize optical sensors, a contextual factor depending on motion might utilize an accelerometer, etc. However, status information might also be retrieved from a data store, generated by a processor (including but not limited to a processor executing the method of the present invention), acquired from an input, etc.

In addition and as previously noted, in determining the status of contextual factors it may be useful for at least some embodiments to utilize various recognition capabilities. The nature of recognition capabilities (if any) will be determined at least in part by the contextual factors in question. For example, if the presence of an object is utilized as a contextual factor, then enabling some form of object recognition capable of identifying the relevant object may be useful (although perhaps not required, if the object can also/instead be identified by color, outline, etc.). Recognition capabilities supportive of determining the status of contextual factors may include but are not limited to position recognition, motion recognition, acceleration recognition, face recognition, object recognition, text recognition, and environmental recognition.

In addition, determining the status of contextual factors may include other approaches, such as detection of features that do not necessarily correspond directly with objects. For example, detecting a transition between a sky and a cityscape might not necessarily entail recognition of any particular object or feature, but may still be useful in terms of determining the location at a particular city, within a city, etc. Transitions that may be identified in determining the status of contextual factors include but are not limited to color transitions, brightness transitions, distance transitions, and focus transitions.

It is emphasized that these are examples only and that the present invention is not limited only to recognition and transition detection in determining the status of contextual factors. Other approaches may be equally suitable.

With regard now to step 124 in FIG. 1, further discussion is herein presented regarding transformations to output data in the context of the present invention.

As previously described with respect to step 124 in FIG. 1, a transformation is applied therein to the output data (if the determination of step 118 in FIG. 1 is positive). The present invention is not particularly limited with regard to the transformation.

One possible type of transformation of the output data in the present invention is to limit the region of a viewer's visual field wherein the output data may be displayed. Such an arrangement may or may not alter the "screen content" of the output data (for cases where the data is then outputted to a video screen), but does alter the output data at least insofar as the transformation affects where and/or how the output data is outputted. Thus, transformations to the output data are not limited only to "screen content" or the substance of what data is displayed, but also to what might be referred to as "metadata", i.e. information regarding where the output data is displayed, the resolution at which the output data is displayed, the coloring, frame rate, etc. For purposes of the present invention, such "metadata" may be considered to be part of the output data, and therefor may be subject to transformation.

A very large range of potential transformations may be made within the scope of the present invention. Several examples regarding transformations limiting wherein the viewer's visual field the output data may be outputted are presented below, so as to illustrate some possible transformations. However, it is emphasized that the present invention is not limited only to the specific position-related transformations presented as examples herein, nor is the present invention limited only to transformations affecting the positioning of output data.

Figure 5:
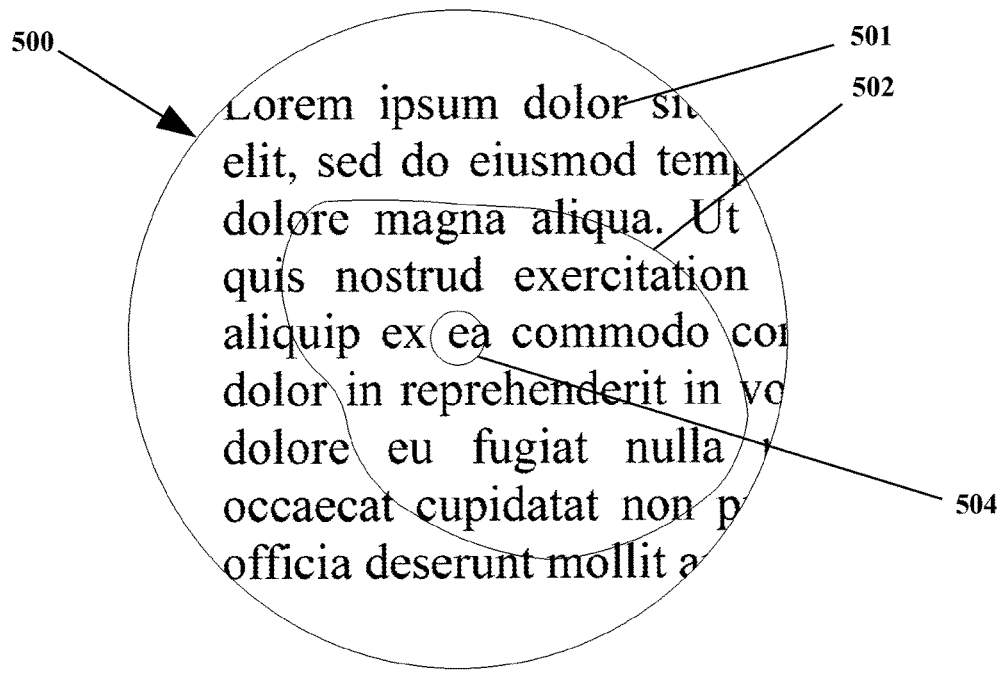
FIG. 5 shows an arrangement of output data with respect to typical human visual fields.

Referring now to FIG. 5, therein a visual map 500 is presented. The visual map 500 is at least somewhat similar to the visual map shown in FIG. 2, however, for clarity and simplicity the angular hash marks and labels are omitted from FIG. 5. The outline identified as 502 in FIG. 5 corresponds approximately to a human's peripheral visual field. The outline identified as 504 in FIG. 5 corresponds approximately to a human's central visual field.

As may be seen, FIG. 5 also shows output data 501 in the form of text. While the present invention is not limited only to text as output data, the text is used in FIG. 5 and in several subsequent figures herein as an example to represent output data 501. As shown in FIG. 5 the output data 501 is not restricted as to output location. Output data 501 exists within the central visual field 504, extends throughout the peripheral visual field 502, and even beyond the peripheral visual field 502. It is noted that output data 501 that is outputted beyond the peripheral visual field 502 may not be visible since the peripheral field substantially represents the limits of the human visual field overall. However, the present invention is not necessarily restricted from outputting output data 501 outside the human visual field. For example, for output data 501 that is presented as substantially fixed relative to a point in space, a viewer might be able to pan and/or tilt his or her eyes and/or head to view a larger total area that is encompassed by the human visual field at any given moment. More with regard to such a pan/tilt arrangement is described later herein, but the present invention is not limited only to such a pan/tilt arrangement insofar as outputting output data 501 outside of a viewer's visual field.

With regard to FIG. 6 through FIG. 17, therein output data is shown outputted as limited to and/or excluded from various regions, such as regions of a viewer's visual field, as might be executed through a transformation according to the present invention. Such output arrangements may be useful for various purposes. For example, since the human visual field has high resolution in the central visual field thereof, limiting to the central visual field the output of information that requires or benefits from discrimination of fine detail, such as text, may be advantageous under at least some circumstances. Conversely, if the viewer is known or considered likely to be executing some activity that would require or at least benefit from unobstructed central vision, such as walking or running while seeing clearly so as to avoid obstacles and/or hazards, excluding the output of output data to the central visual field, may likewise be advantageous. As another example, since the human peripheral visual field has high sensitivity to light and motion, limiting to the peripheral visual field the output of information that requires or benefits from high sensitivity to light or motion, such as directional indicators or high-priority notices, may also be advantageous under at least some circumstances.

For at least some embodiments, if a transformation is employed so as to limit output of information to a particular region of a viewer's visual field, and/or to otherwise produce an effect that is related to the viewer's visual field and/or some specific region thereof, it may be useful to utilize eye tracking so as to reliably determine where a viewer is looking, which is to say, how the viewer's visual fields are aligned. More specifically, when outputting for example to one or more displays disposed in front of a viewer's eye or eyes, eye tracking may be useful in determining what portion of the screen(s) represent the peripheral visual field, central visual field, etc. of the viewer, so as to effectively limit output thereto, exclude output therefrom, etc. In such an arrangement, the portion of a physical screen that represents, for example, the viewer's central visual field may change over time depending upon where the viewer looks, so that eye tracking (or some other approach for determining where the viewer is looking) may help define what portion of a physical display or other device corresponds substantially with the viewer's central visual field. However, such arrangements are examples only, and neither eye tracking nor other such arrangements will necessarily be utilized for all embodiments.

Figure 6:
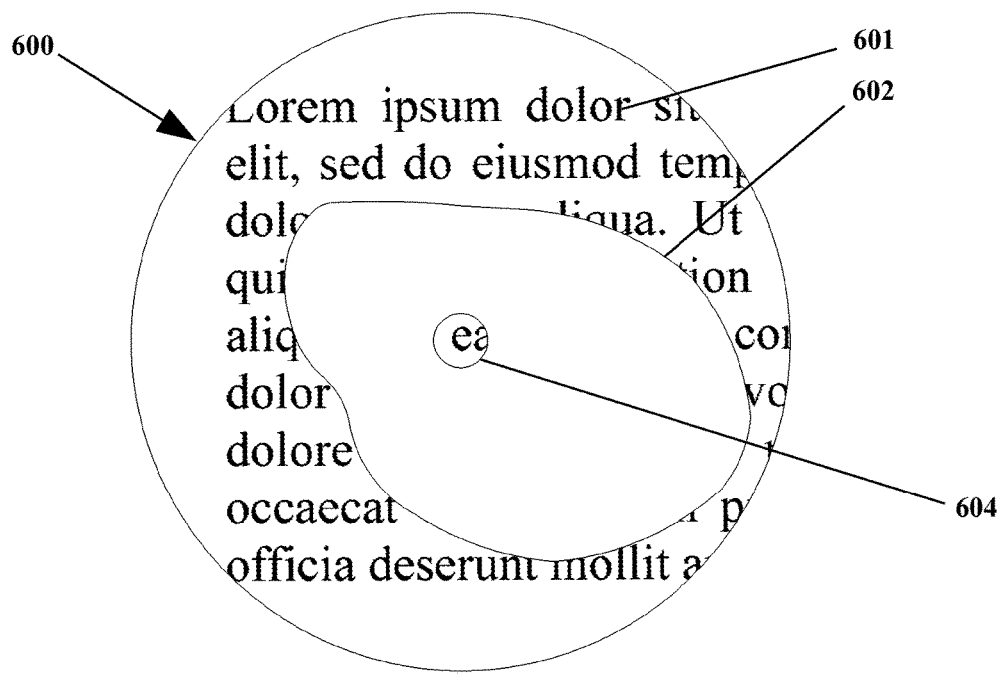
FIG. 6 shows an arrangement of output data excluding the peripheral visual field.

Turning specifically to FIG. 6, another visual map 600 is presented therein. The visual map 600 is at least somewhat similar to the visual map shown in FIG. 5, with output data 601, an outline 602 that corresponds approximately to a human's peripheral visual field, and an outline 604 in that corresponds approximately to a human's central visual field.

However, as may be seen in FIG. 6, the output data 601 does not appear within the peripheral visual field 602. The arrangement in FIG. 6 may be a result, for example, of a transformation applied to output data 601 so as to define an output region and limiting the output of output data 601 thereto, with the output region substantially excluding a viewer's peripheral visual field 602.

Figure 7:
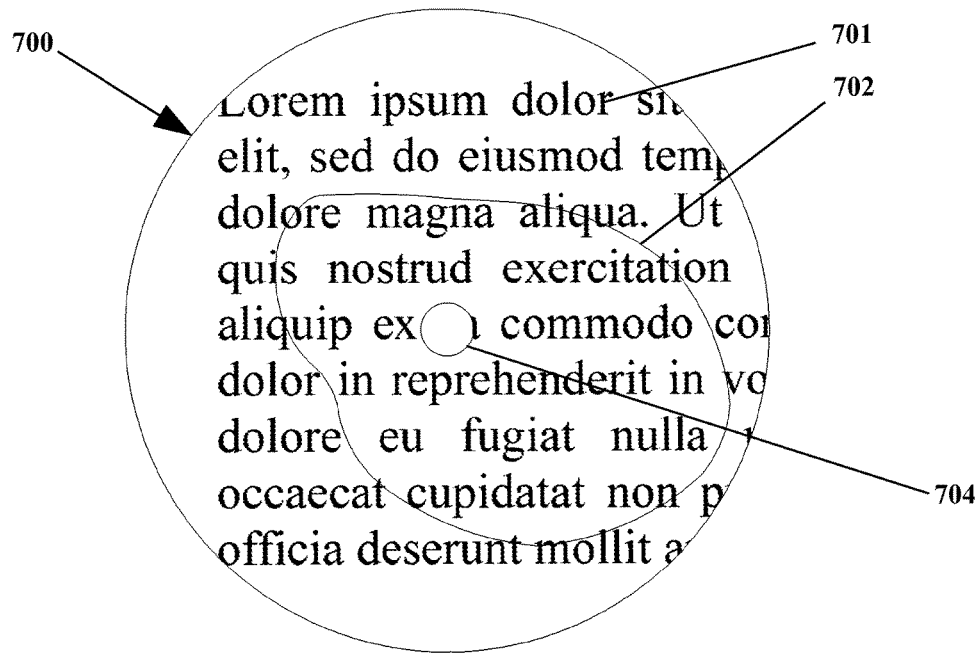
FIG. 7 shows an arrangement of output data excluding the central visual field.

Now with respect to FIG. 7, another visual map 700 is presented therein. The visual map 700 is again at least somewhat similar to the visual map shown in FIG. 5, with output data 701, an outline 702 that corresponds approximately to a human's peripheral visual field, and an outline 704 in that corresponds approximately to a human's central visual field.

However, as may be seen in FIG. 7, the output data 701 does not appear within the central field of view 704. The arrangement in FIG. 7 may be a result, for example, of a transformation applied to output data 701 so as to define an output region and limiting the output of output data 701 thereto, with the output region substantially excluding a viewer's central visual field 704.

As has been described, the present invention is not limited only to transformations that define output regions, and/or limit output thereto and/or exclude output therefrom, or otherwise affect the location of output data. With regard to FIG. 7, it is noted also that the present invention, even when so affecting the location of output data, is not limited to regions defining entire visual fields, or individual visual fields. For example, output to the central visual field 702 is excluded in FIG. 7, although as previously noted the human central visual field may itself be subdivided into the macular, foveal, and foveolar visual fields. Thus in some sense the arrangement of FIG. 7 may be understood to show the exclusion of output from three distinct visual fields. Other arrangements, including but not limited to defining output location in terms of portions of one or more visual fields and/or defining output location in terms unrelated to human visual fields, may be equally suitable.

Figure 8:
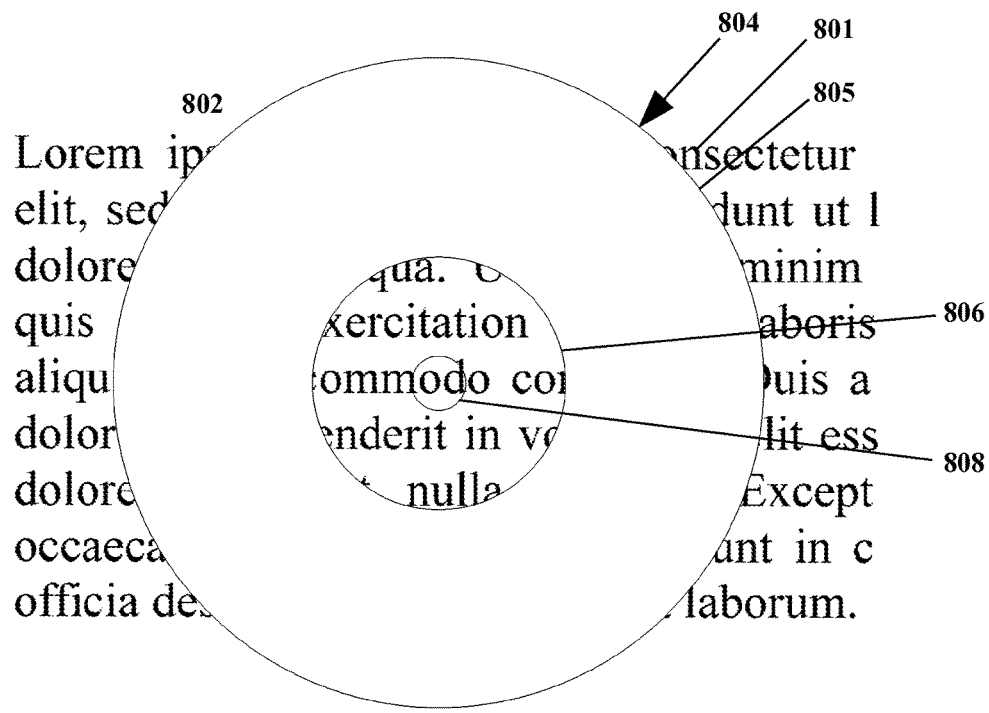
FIG. 8 shows an arrangement of output data excluding the macular visual field.

Referring now to FIG. 8, a portion of a human visual field is shown therein. The arrangement in FIG. 8 is at least somewhat similar to the arrangement shown in FIG. 3, however, for clarity and simplicity, the angular hash marks and labels are omitted from FIG. 8. The outline identified as 804 in FIG. 8 corresponds approximately to a human's central visual field, while the region outside the central visual field 804 corresponds to a portion of a human's peripheral visual field 802. The outline identified as 805 in FIG. 8 corresponds approximately to a human's macular visual field, the outline identified as 806 in FIG. 8 correspond approximately to a human's foveal visual field, and the outline identified as 808 in FIG. 8 corresponds approximately to a human's foveolar visual field. FIG. 8 also shows output data 801 in the form of text.

As may be seen in FIG. 8, the output data 801 does not appear within the macular visual field 805. The arrangement in FIG. 8 may be a result, for example, of a transformation applied to output data 801 so as to define an output region and limiting the output of output data 801 thereto, with the output region substantially excluding a viewer's macular visual field 805.

Figure 9:
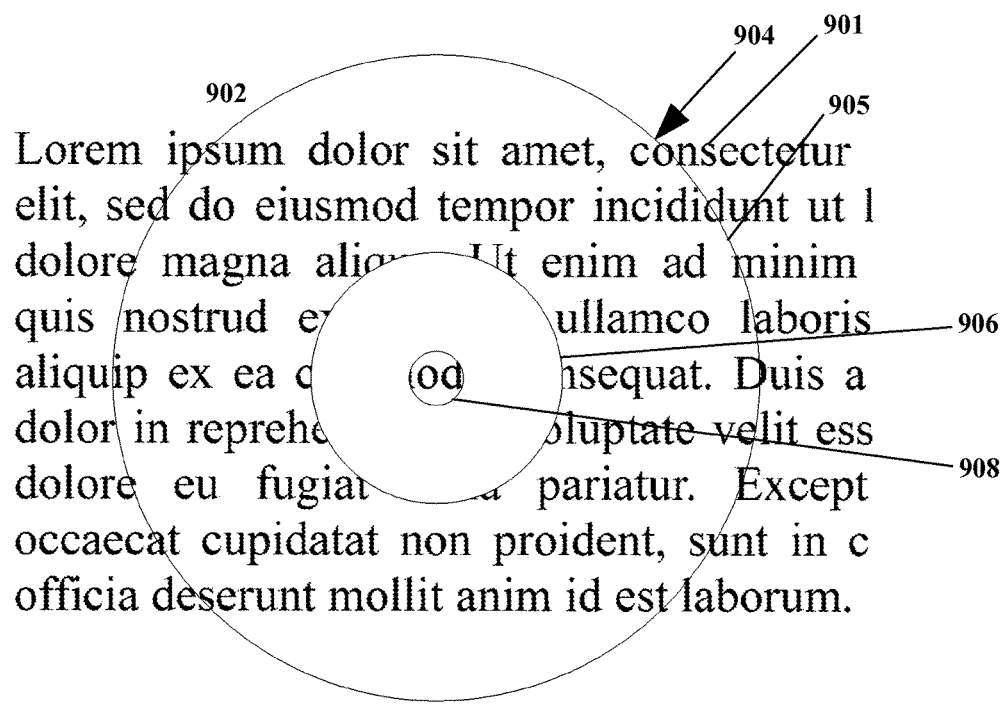
FIG. 9 shows an arrangement of output data excluding the foveal visual field.

Moving to FIG. 9, another portion of a human visual field is shown therein. FIG. 9 is again at least somewhat similar to FIG. 3, showing a portion of the peripheral visual field 902, the central visual field 904, the macular visual field 905, the foveal visual field 906, and the foveolar visual field 908, along with output data 901.

However, as may be seen in FIG. 9, the output data 901 does not appear within the foveal visual field 906. The arrangement in FIG. 9 may be a result, for example, of a transformation applied to output data 901 so as to define an output region and limiting the output of output data 901 thereto, with the output region substantially excluding a viewer's foveal visual field 906.

Figure 10:
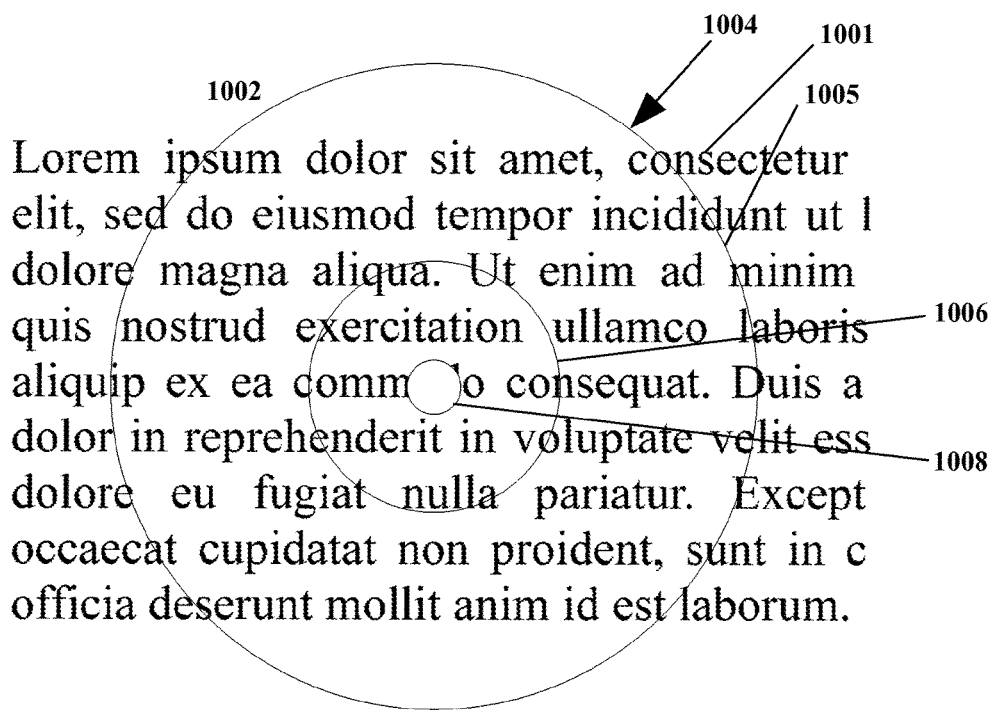
FIG. 10 shows an arrangement of output data excluding the foveolar visual field.

Turning to FIG. 10, another portion of a human visual field is shown therein. FIG. 10 is again at least somewhat similar to FIG. 3, showing a portion of the peripheral visual field 1002, the central visual field 1004, the macular visual field 1005, the foveal visual field 1006, and the foveolar visual field 1008, along with output data 1001.

However, as may be seen in FIG. 10, the output data 1001 does not appear within the foveolar visual field 1008. The arrangement in FIG. 10 may be a result, for example, of a transformation applied to output data 1001 so as to define an output region and limiting the output of output data 1001 thereto, with the output region substantially excluding a viewer's foveolar visual field 1008.

Figure 11:
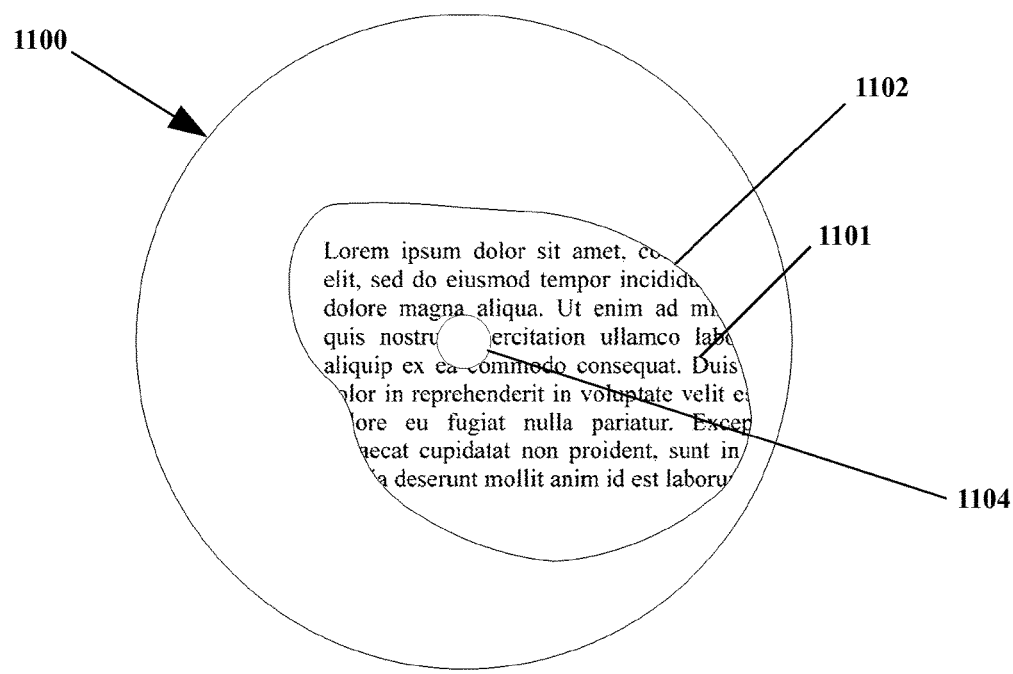
FIG. 11 shows an arrangement of output data limited to the peripheral visual field.

Now with regard to FIG. 11, another visual map 1100 is presented therein. The visual map 1100 is at least somewhat similar to the visual map shown in FIG. 5, with output data 1101, an outline 1102 that corresponds approximately to a human's peripheral visual field, and an outline 1104 in that corresponds approximately to a human's central visual field.

However, as may be seen in FIG. 11, the output data 1101 appears only within the peripheral visual field 1102. The arrangement in FIG. 11 may be a result, for example, of a transformation applied to output data 1101 so as to define an output region and limiting the output of output data 1101 thereto, with the output region substantially corresponding to a viewer's peripheral visual field 1102.

Figure 12:
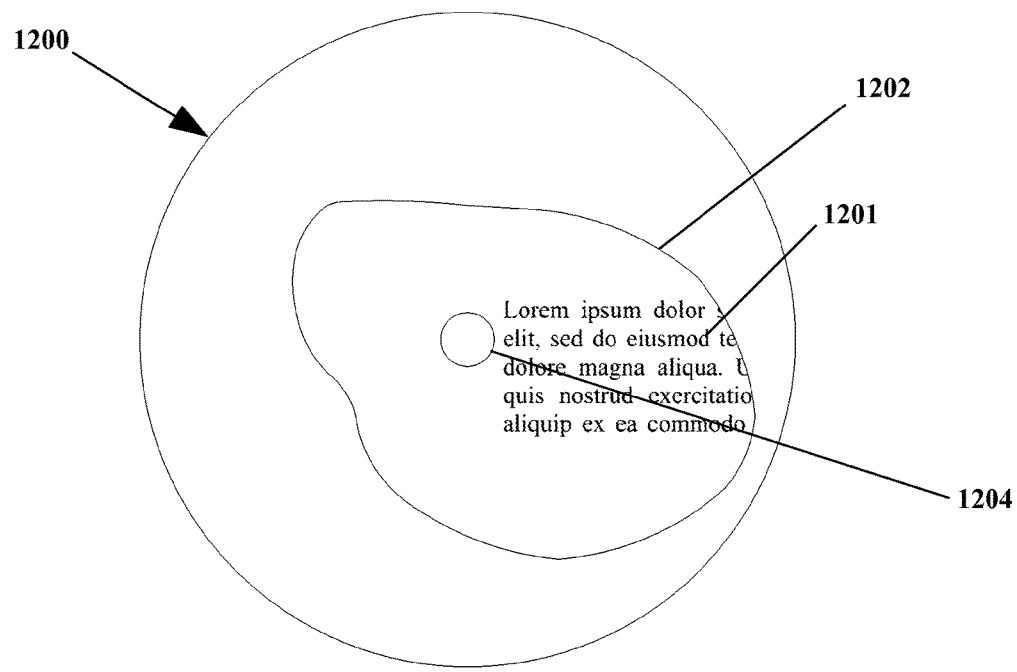
FIG. 12 shows another arrangement of output data limited to the peripheral visual field.

FIG. 12 also shows a visual map 1200 therein. The visual map 1200 is at least somewhat similar to the visual map shown in FIG. 11, with output data 1201, an outline 1202 that corresponds approximately to a human's peripheral visual field, and an outline 1204 in that corresponds approximately to a human's central visual field.

As may be seen in FIG. 12, the output data 1201 appears only within the peripheral visual field 1202. The arrangement in FIG. 12 may be a result, for example, of a transformation applied to output data 1201 so as to define an output region and limiting the output of output data 1201 thereto, with the output region substantially corresponding to a viewer's peripheral visual field 1202.

However, while the arrangement of the output data 1201 in FIG. 12 is at least somewhat descriptively similar to the arrangement in FIG. 11—in both instances output data appears only within the peripheral visual field—a comparison of FIG. 11 and FIG. 12 reveals differences in the arrangement of the output data therein. Namely, in FIG. 11 that portion of the output data 1101 that might be expected to align with the central visual field 1104 is not displayed. By contrast, in FIG. 12 the output data 1201 is positioned and configured differently, such that even though no data is displayed within the central visual field 1204 no data is "masked" by the area of non-display corresponding to the central visual field 1204.

While in some cases in FIG. 6 through FIG. 17 the display or lack of display of output data in various areas is shown in simple form, with areas simply blanked out, this is an example only and is presented for purposes of simplicity. As may be seen from FIG. 12, limiting output data 1201 to certain areas and/or excluding output data 1201 from certain regions does not necessarily imply truncating, losing, or not displaying some portion of the output data. Although so limiting output data is not prohibited for the present invention, neither is so limiting output data required. Likewise, other transformations may, but are not required to, transform output data in a manner as to obstruct, limit, truncate, etc. the output data.

Figure 13:
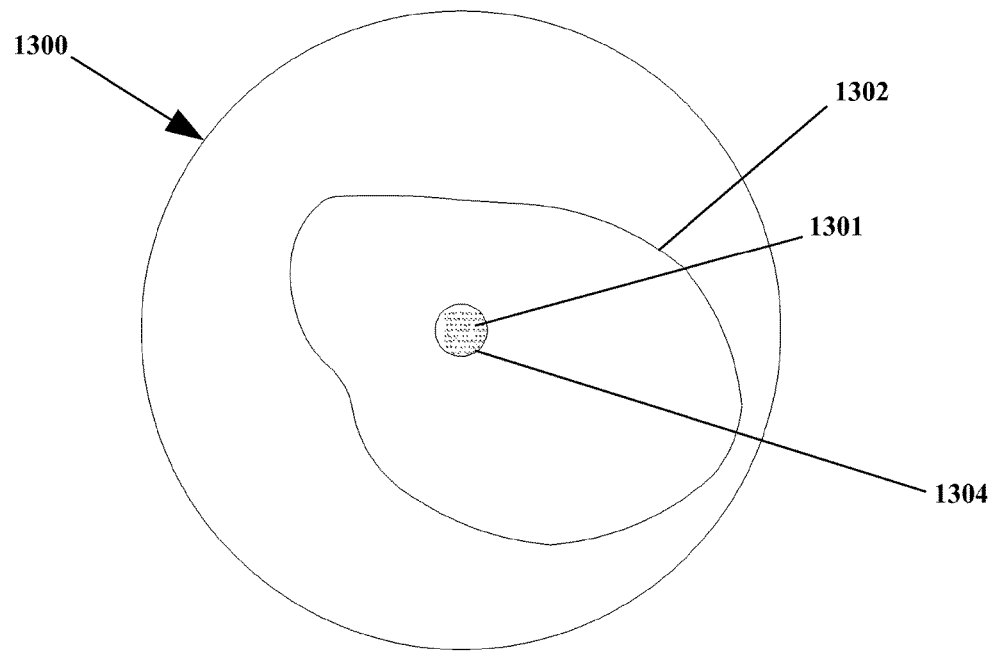
FIG. 13 shows an arrangement of output data limited to the central visual field.

Moving on to FIG. 13, another visual map 1300 is presented therein. The visual map 1300 is at least somewhat similar to the visual map shown in FIG. 5, with output data 1301, an outline 1302 that corresponds approximately to a human's peripheral visual field, and an outline 1304 in that corresponds approximately to a human's central visual field.

As may be seen in FIG. 13 the output data 1301 appears only within the central visual field 1304. The arrangement in FIG. 13 may be a result, for example, of a transformation applied to output data 1301 so as to define an output region and limiting the output of output data 1301 thereto, with the output region substantially corresponding to a viewer's central visual field 1304.

Figure 14:
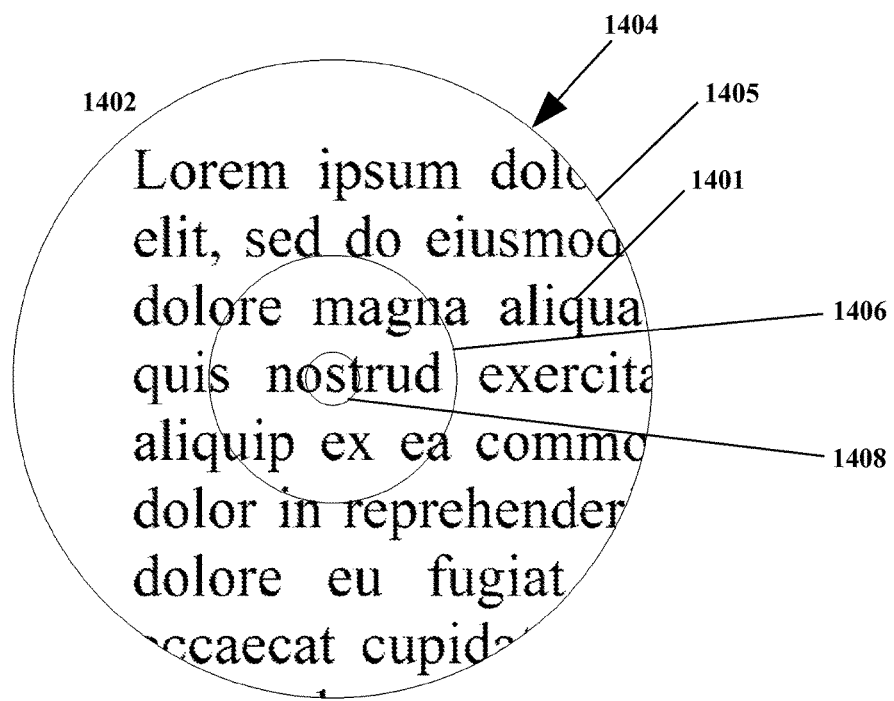
FIG. 14 shows another arrangement of output data limited to the central visual field.

Turning to FIG. 14, another portion of a human visual field is shown therein. FIG. 14 is at least somewhat similar to FIG. 3, showing a portion of the peripheral visual field 1402, the central visual field 1404, the macular visual field 1405, the foveal visual field 1406, and the foveolar visual field 1408, along with output data 1401.

FIG. 14 also shows an arrangement similar to FIG. 13, in that in FIG. 14 the output data 1401 also appears only within the central visual field 1404 (collectively the macular visual field 1405, the foveal visual field 1406, and the foveolar visual field 1408). As with FIG. 13, the arrangement in FIG. 14 may be a result, for example, of a transformation applied to output data 1401 so as to define an output region and limiting the output of output data 1401 thereto, with the output region substantially corresponding to a viewer's central visual field 1404.

Figure 15:
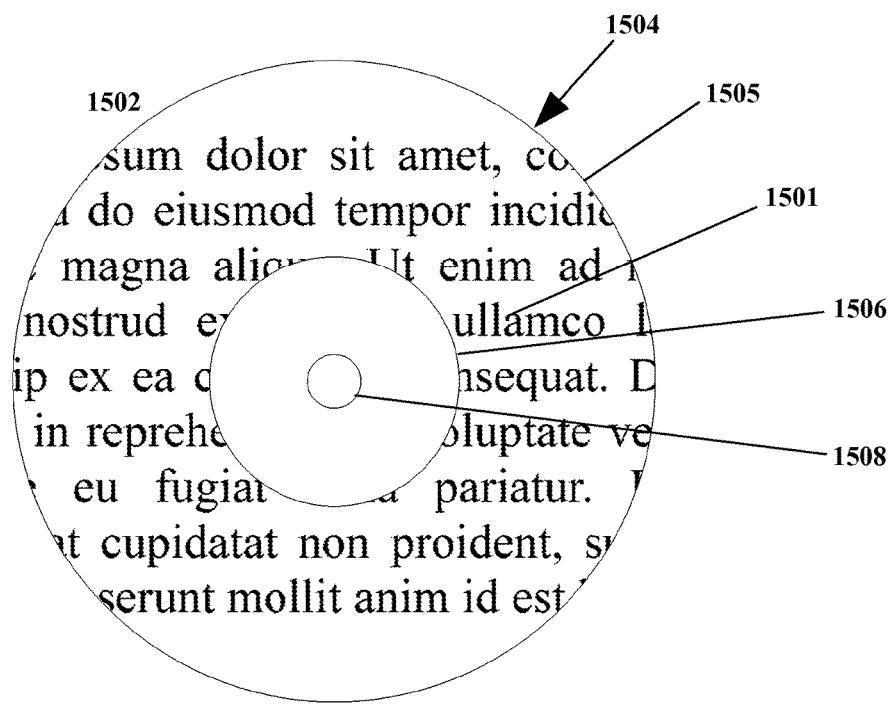
FIG. 15 shows an arrangement of output data limited to the macular visual field.

Now with reference to FIG. 15, another portion of a human visual field is shown therein. FIG. 15 is at least somewhat similar to FIG. 3, showing a portion of the peripheral visual field 1502, the central visual field 1504, the macular visual field 1505, the foveal visual field 1506, and the foveolar visual field 1508, along with output data 1501.

As may be seen in FIG. 15 the output data 1501 appears only within the macular visual field 1505. The arrangement in FIG. 15 may be a result, for example, of a transformation applied to output data 1501 so as to define an output region and limiting the output of output data 1501 thereto, with the output region substantially corresponding to a viewer's macular visual field 1505.

Figure 16:
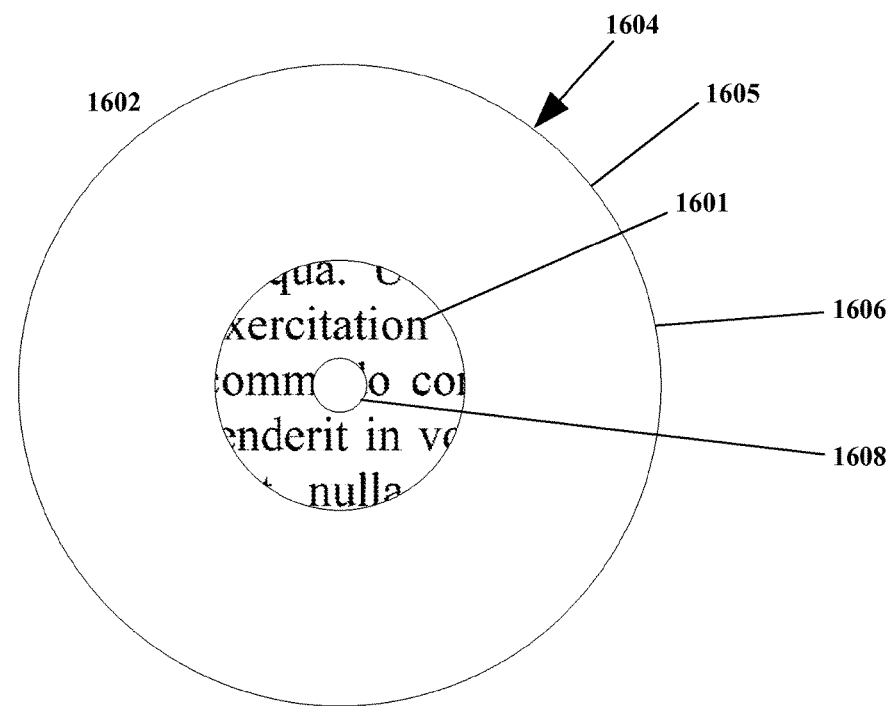
FIG. 16 shows an arrangement of output data limited to the foveal visual field.

With regard to FIG. 16, another portion of a human visual field is shown therein. FIG. 16 is at least somewhat similar to FIG. 3, showing a portion of the peripheral visual field 1602, the central visual field 1604, the macular visual field 1605, the foveal visual field 1606, and the foveolar visual field 1608, along with output data 1601.

As may be seen in FIG. 16 the output data 1601 appears only within the foveal visual field 1606. The arrangement in FIG. 16 may be a result, for example, of a transformation applied to output data 1601 so as to define an output region and limiting the output of output data 1601 thereto, with the output region substantially corresponding to a viewer's foveal visual field 1606.

Figure 17:
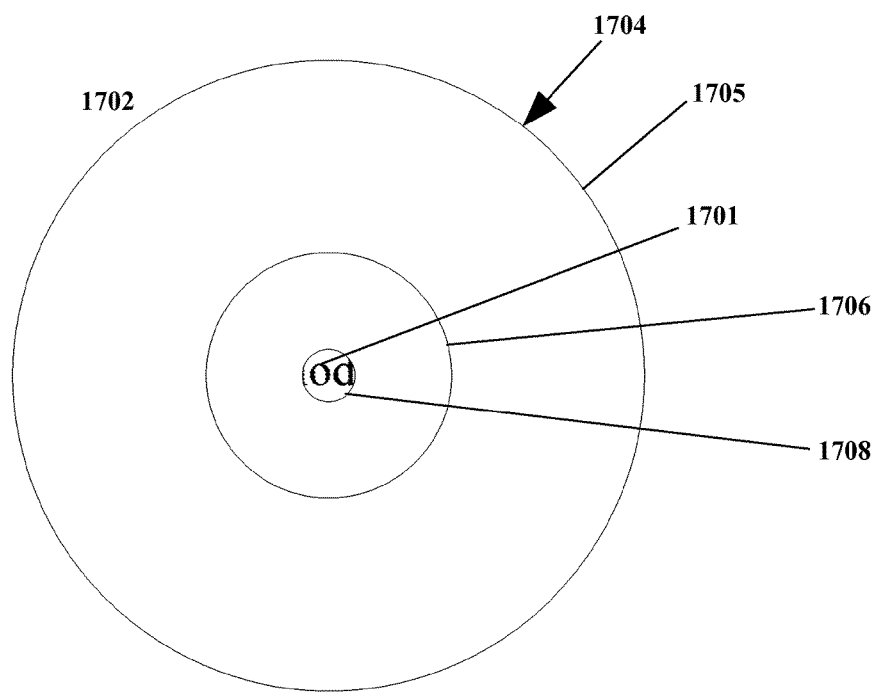
FIG. 17 shows an arrangement of output data limited to the foveolar visual field.

Now with reference to FIG. 17, another portion of a human visual field is shown therein. FIG. 17 is at least somewhat similar to FIG. 3, showing a portion of the peripheral visual field 1702, the central visual field 1704, the macular visual field 1705, the foveal visual field 1706, and the foveolar visual field 1708, along with output data 1701.

As may be seen in FIG. 17 the output data 1701 appears only within the foveolar visual field 1708. The arrangement in FIG. 17 may be a result, for example, of a transformation applied to output data 1701 so as to define an output region and limiting the output of output data 1701 thereto, with the output region substantially corresponding to a viewer's foveolar visual field 1708.

With respect to FIG. 6 through FIG. 17, as has been stated previously these illustrations are examples of transformations that may be invoked if the status of a contextual factor is determined to meet a standard therefor. Spatial and/or position transformations including but not limited to those illustrated in FIG. 6 through FIG. 17 may be useful for at least certain embodiments of the present invention, and illustrations thereof are presented herein as examples at least in part of that purpose.

However, the present invention is not limited only to the spatial/positional transformations shown as examples in FIG. 6 through FIG. 17. For example, a transformation that disposes readable text substantially below the horizon in a viewer's field of view (e.g. by defining a first output region that is below that horizon) may be suitable, perhaps in response to a contextual factor relating to whether the viewer's head position corresponds to a near-distance reading position. Other spatial/positional transformations may also be equally suitable. Moreover, the present invention also is not limited only to spatial and/or positional transformations in general.

Substantially any feature of the output data, and/or of the display or other device or method for outputting the output data, may be transformed as part of a transformation according to the present invention. The transformation may include at least a partial determination and/or re-determination of at least one property of the output data.

As previously noted, transformations may include a definition of one or more output regions, and limiting output thereto and/or excluding output therefrom. Such output regions may, but are not required to, correspond with one or more anatomical and/or functional regions of a viewer's visual field.

Where multiple transformations are utilized, transformations may be identical, similar, or entirely distinct from one another. As an example of multiple transformations, a first transformation might define a first output region and limit the output of the output data thereto or exclude output therefrom, while a second transformation might define a second output region and limit the output of the output data thereto or exclude output therefrom. As a more particular example, a first transformation might define a first output region that corresponds to the viewer's central visual field (thus excluding the peripheral visual field) and limiting output data thereto, while the second transformation might define a second output region that corresponds to the viewer's peripheral visual field (thus excluding the central visual field) and limiting output data thereto. (More description regarding invoking multiple transformations is provided subsequently herein.)

A transformation may include a definition of one or more subsets of the output data, with the output being limited only to the subset or subsets. That is, the output data might be truncated or otherwise reduced as part of the transformation.

Transformations may include multiple changes to multiple features of the output data. To continue the example of generating subsets of output data, a transformation might define first and second subsets of output data, and may also generate first and second output regions, limiting the output of the first subset to the first output region and the second subset to the second output region.

Transformations may also include, but are not limited to, at least partial determination (and/or re-determination) of the presence of output data, the location of output data, the size of output data, an abridgement (or lack of same) of output data, the dimensionality of output data (e.g. changing between two dimensional and three dimensional, etc.), the resolution of output data, the color of output data (including but not limited to bit depth and other color properties), the brightness of output data, the contrast of output data, the transparency and/or opacity of output data, the motion of output data, the animation and/or animation properties of output data (if any), and the frame rate of output data. The above are examples only, and other properties may be equally suitable for determination and/or re-determination through transformations according to the present invention.

As has also been noted, the present invention is not particularly limited with regard to the type, form, and/or quantity of output data that is generated, transformed, and/or outputted. As examples, output data (whether before or after transformation) may include but is not limited to text, graphics, images, video, image augmentations, and sound.

Where output data is generated partially or entirely from input data, output data (whether before or after transformation) may include all of the input data, some of the input data, or none of the input data. Moreover, the output data may be an empty set. That is, whether before or after transformation, no output data is required to be either generated or transformed or outputted.

Further with regard to outputting data, it is noted that with or without (and before or after) transformation, output data in the present invention may vary considerably within the present invention. For example, as previously noted output data may be generated and/or outputted in an arrangement that exceeds the visual field of the viewer at any given time. Panning, tilting, angling, etc. of the head by the viewer may then reveal more and/or different portions of the output data. Such an arrangement is illustrated in FIG. 18 through FIG. 21.

Figure 18:
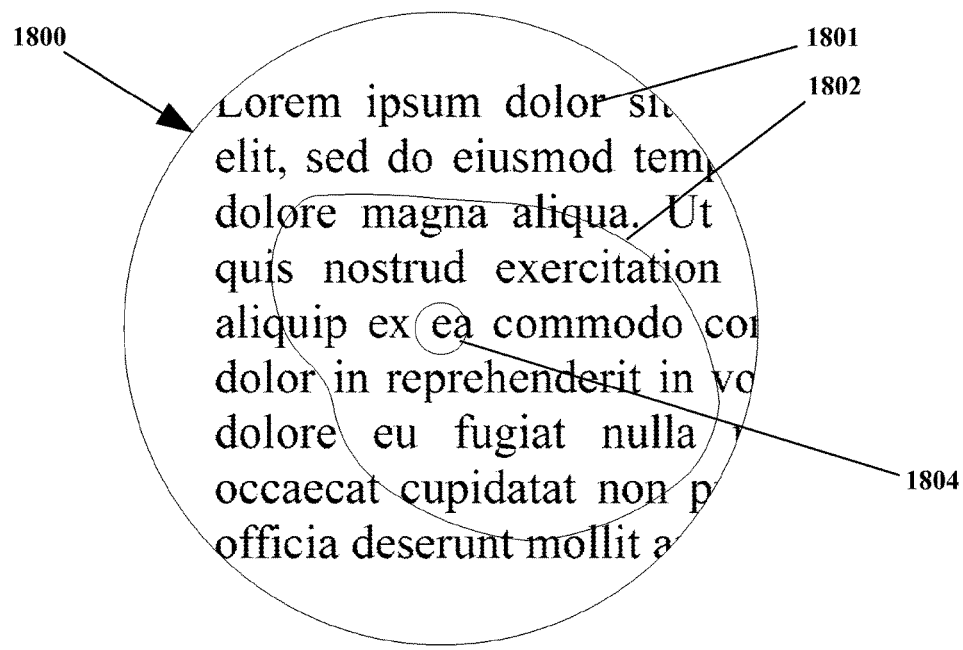
FIG. 18 shows an arrangement of output data with a viewer's visual field in a neutral position.

With regard to FIG. 18, therein a visual map 1800 is presented. The outline identified as 1804 in FIG. 5 corresponds approximately to a human's peripheral visual field. The outline identified as 1802 in FIG. 5 corresponds approximately to a human's central visual field. Output data 1801 in the form of text exists within the visual map.

As may be seen, the central visual field 1804 and peripheral visual field 1802 combined, representing substantially a human eye's entire visual field, encompass only a portion of the output data 1801.

Figure 19:
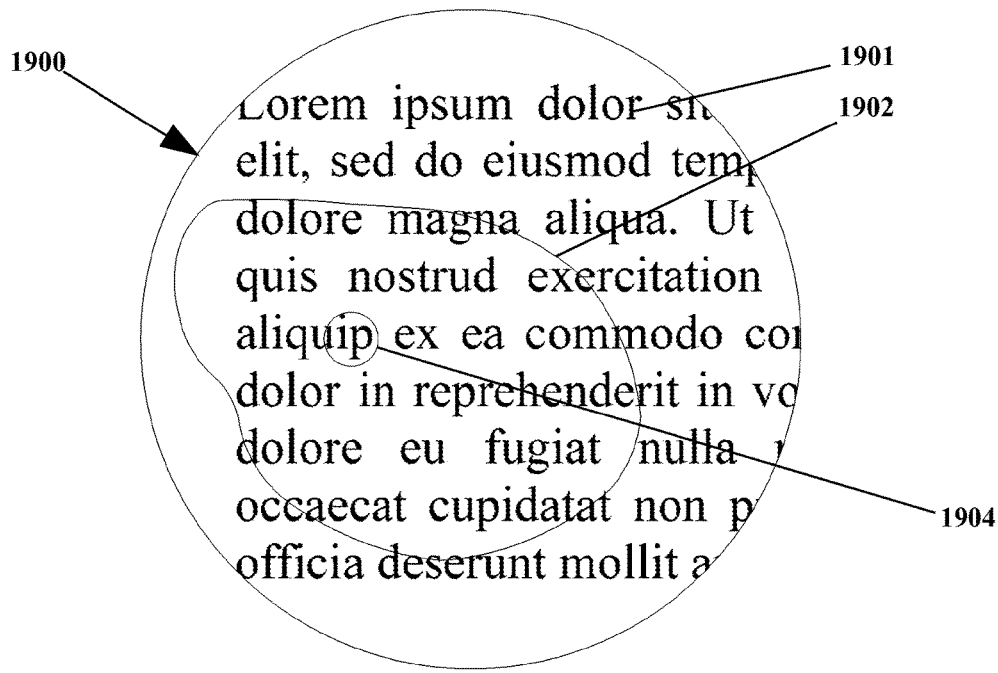
FIG. 19 shows an arrangement of output data with a viewer's visual field panned left.

Moving now to FIG. 19, another visual map 1900 is presented, again with a central visual field 1904, a peripheral visual field 1902, and output data 1901. However, as may be seen from a comparison with FIG. 18, in FIG. 19 the central visual field 1904 and peripheral visual field 1902 are shifted to the left (panned), resulting in a different portion of the input data 1901 being within the central visual field 1904 and peripheral visual field 1902. This may be a result of the output data 1901 being outputted so as to be substantially fixed relative to some point, with the viewer then panning his or her sight to the left. Alternately, this may be considered to represent a viewer panning to the left, with the output data 1901 then being shifted correspondingly in an opposite direction (right), i.e. as displayed on a head-mounted display screen, so as to present the appearance of the output data being substantially fixed.

In such an arrangement, the combination of the central visual field 1904 and the peripheral visual field 1902 may be considered collectively as a moveable "window" onto a larger arrangement of output data 1901. In practice, only that portion of the output data 1901 that is within the window (in the case of FIG. 19 the combined central visual field 1904 and the peripheral visual field 1902) may be outputted at any given time, although outputting more than such a window could accommodate also is not prohibited.

Figure 20:
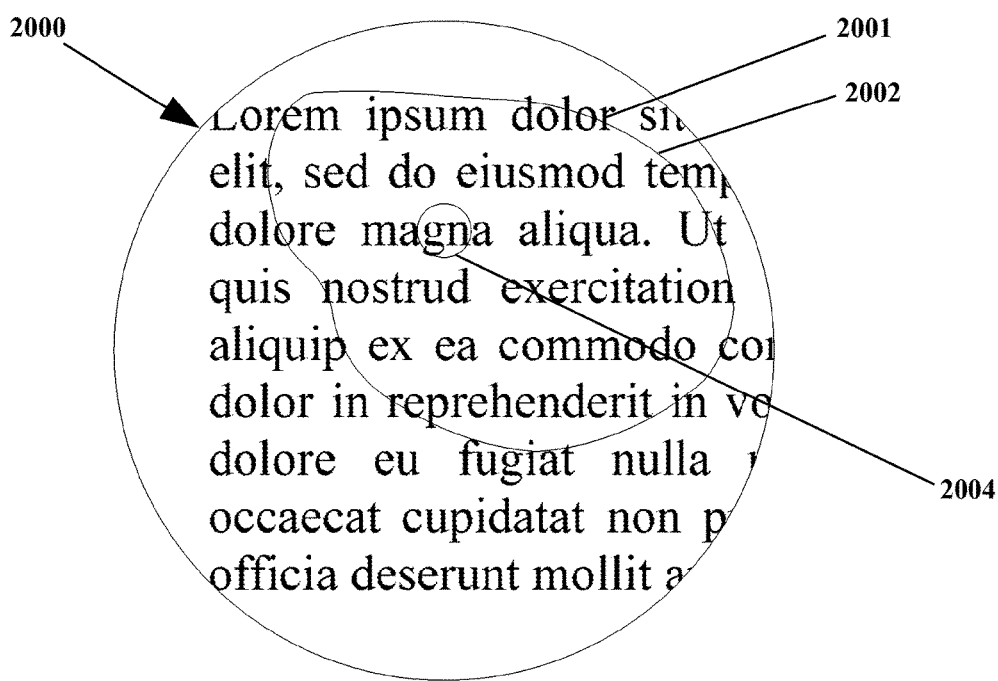
FIG. 20 shows an arrangement of output data with a viewer's visual field tilted up.

Similarly in FIG. 20, another visual map 2000 is presented, again with a central visual field 2004, a peripheral visual field 2002, and output data 2001. However, as may be seen from a comparison with FIG. 18, in FIG. 20 the central visual field 2002 and peripheral visual field 2004 are shifted to the left (tilted, or elevated), resulting in yet a different portion of the input data 2001 being within the central visual field 2004 and peripheral visual field 2002. This may be a result of the output data 2001 being outputted so as to be substantially fixed relative to some point, with the viewer then tilting his or her sight upward. Alternately, this may be considered to represent a viewer tilting upward, with the output data 2001 then being shifted correspondingly in an opposite direction (downward) so as to present the appearance of the output data being substantially fixed.

Figure 21:
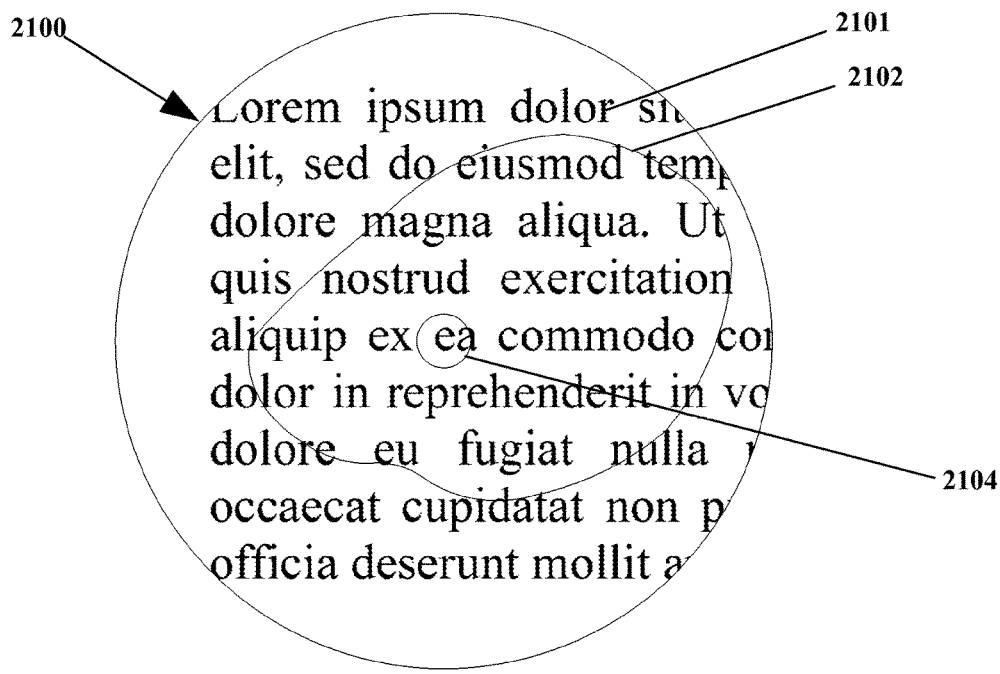
FIG. 21 shows an arrangement of output data with a viewer's visual field inclined counterclockwise.

Likewise with reference to FIG. 21, another visual map 2100 is presented, again with a central visual field 2104, a peripheral visual field 2102, and output data 2101. However, as may be seen from a comparison with FIG. 18, in FIG. 21 the central visual field 2102 and peripheral visual field 2104 are shifted substantially about the central vision (inclined counterclockwise), resulting in still a different portion of the input data 2101 being within the central visual field 2104 and peripheral visual field 2102. This may be a result of the output data 2101 being outputted so as to be substantially fixed relative to some point, with the viewer then inclining his or her sight counterclockwise. Alternately, this may be considered to represent a viewer inclining counterclockwise, with the output data 2101 then being shifted correspondingly in an opposite direction (clockwise) so as to present the appearance of the output data being substantially fixed.

Although FIG. 18 through FIG. 21 are presented with moveable "windows" corresponding substantially with human central and peripheral visual fields, this is an example only. Other window arrangements may be equally suitable.

Other output features and arrangements may likewise be useful for at least certain applications. For example, for stereo output data outputted using a stereo display, it may be advantageous for at least some embodiments to define a natural convergence for the stereo output data that substantially corresponds to a natural reading position, and outputting the output data therewith.

Figure 22:
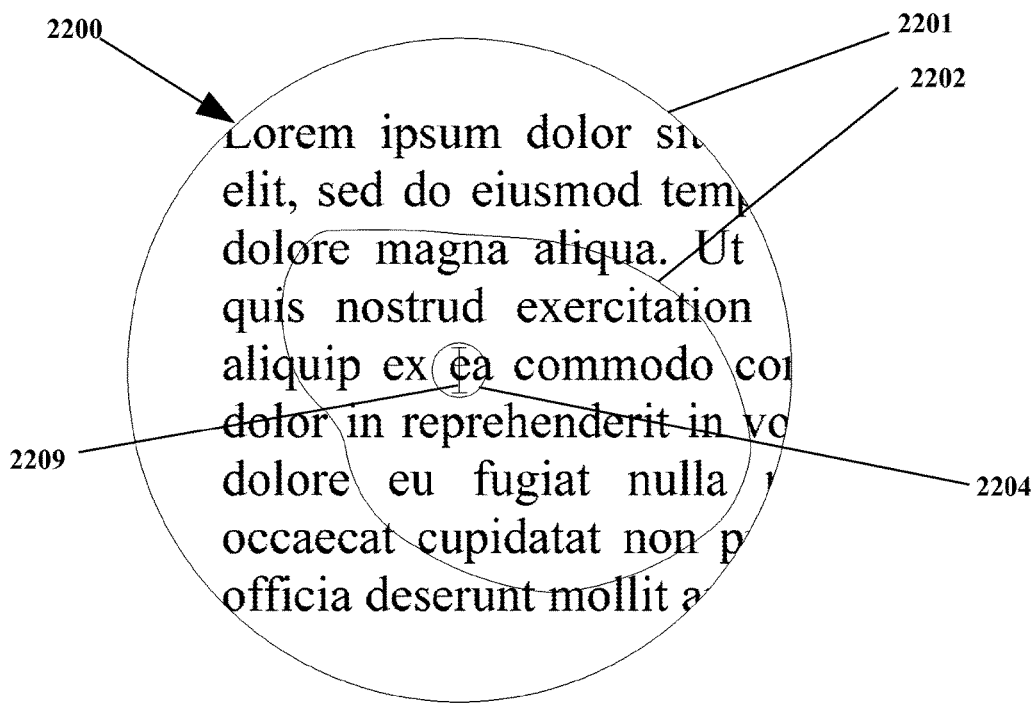
FIG. 22 shows an arrangement of output data including a cursor as a target.

Yet another feature that may be utilized with and/or as part of the output data is the presence of one or more markers. For example, a marker such as a cursor might be outputted so as to be substantially fixed relative to the field of view of the viewer. Such an arrangement is illustrated in FIG. 22. Therein a visual map 2200 is presented, with a central visual field 2104, a peripheral visual field 2202, output data 2201 in the form of text, and a marker 2209 in the form of a cursor disposed within the central visual field 2204.

With regard to FIG. 23 through FIG. 29, the present invention encompasses a number of variations to the basic method as illustrated for example in FIG. 1 and FIG. 4. FIG. 23 through FIG. 29 show additional example arrangements of methods according to the present invention, although it is emphasized that the arrangements shown therein are examples and that the present invention is not limited thereto.

Figure 23:
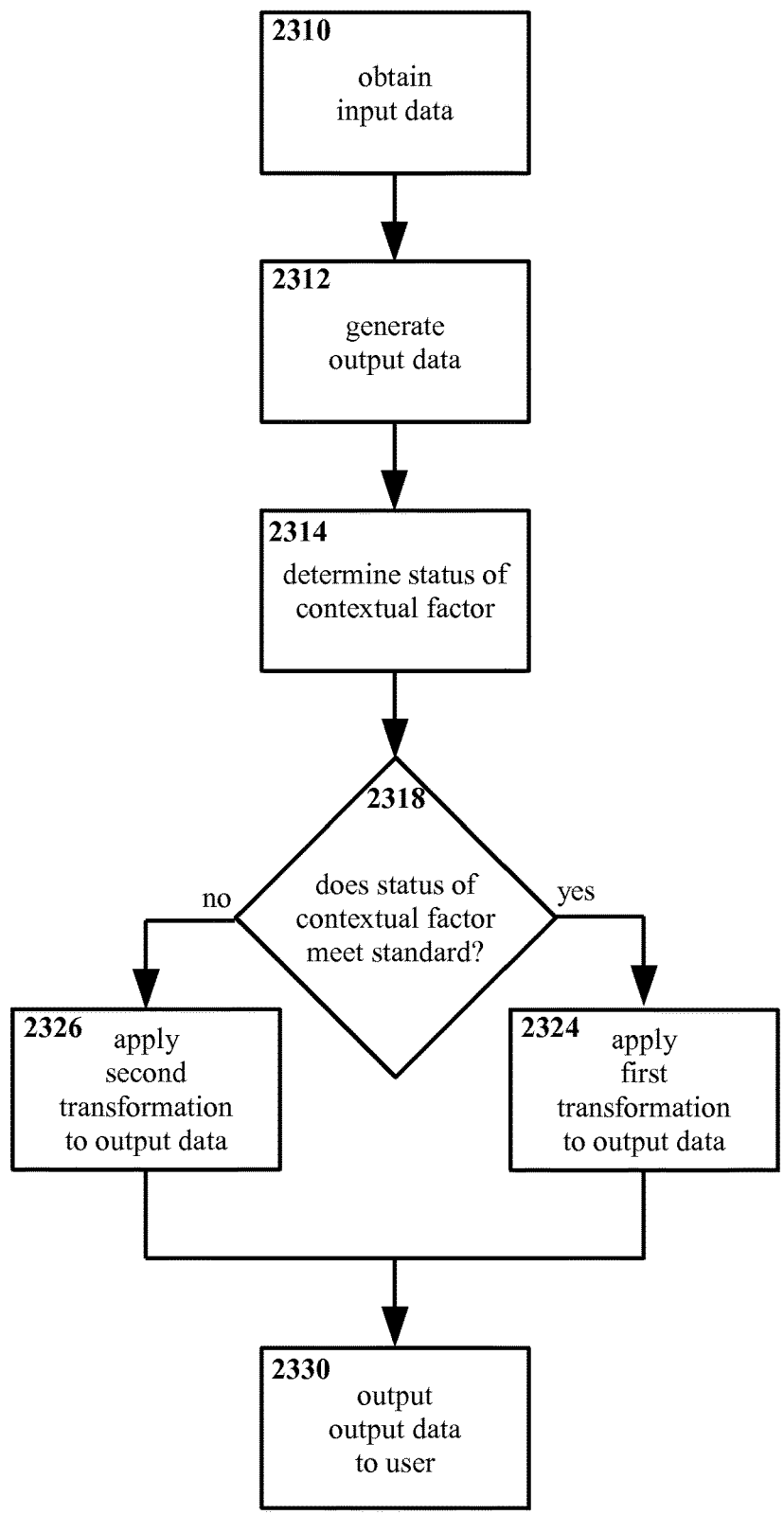
FIG. 23 shows an embodiment of a method for selectively outputting data to a viewer according to the present invention, having a first transformation with a positive status and a second transformation with a negative status.

With reference now specifically to FIG. 23, as has been noted previously the present invention may utilize multiple transformations, and/or may invoke different transformations under different circumstances. One such example arrangement is shown in FIG. 23, wherein a first transformation is applied if the status of a contextual factor meets a standard therefor, while a second transformation is applied if the status does not meet the standard.

In the method as shown in FIG. 23, input data is obtained 2310. Output data is generated 2312. A status of a contextual factor is determined 2314.

A determination is made 2318 as to whether the status of the contextual factor (as determined in step 2314) meets a standard for that contextual factor. If the determination 2318 is positive—if the contextual factor meets the standard—then a first transformation is applied 2324 to the output data. However, if the determination is negative—if the contextual factor does not meet the standard—then a second transformation is applied 2326 to the output data.

The output data is then outputted 2330.

Figure 24:
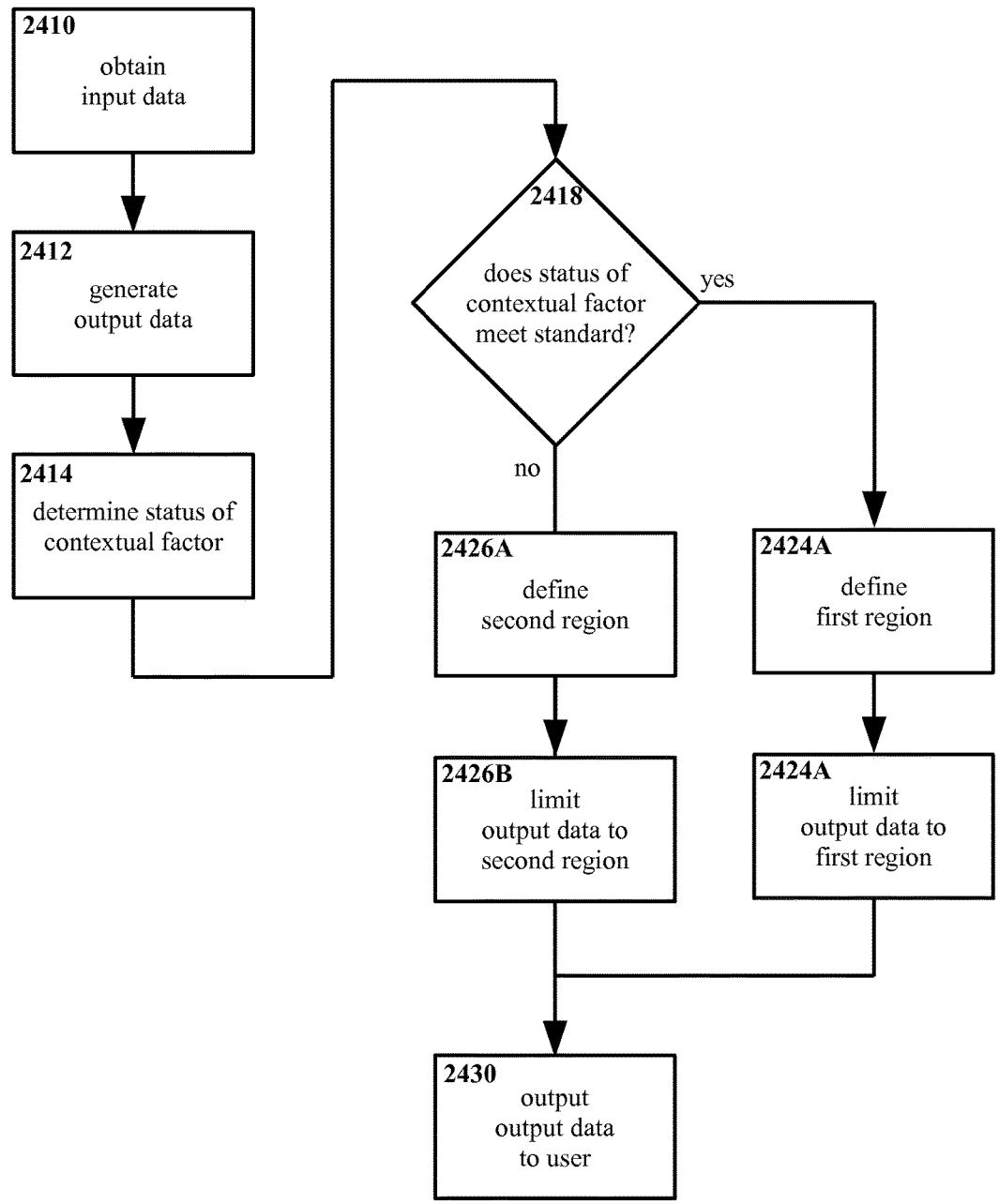
FIG. 24 shows an embodiment of a method for selectively outputting data to a viewer according to the present invention, transforming output to a first region with a positive status and a second region with a negative status.

With reference now to FIG. 24, therein another example arrangement is shown wherein a first transformation is applied if the status of a contextual factor meets a standard therefor, while a second transformation is applied if the status does not meet the standard.

In the method as shown in FIG. 24, input data is obtained 2410, output data is generated 2412, and a status of a contextual factor is determined 2414.

A determination is made 2418 as to whether the status of the contextual factor (as determined in step 2414) meets a standard for that contextual factor. If the determination 2418 is positive, then a first region is defined 2424A, and the output of output data is limited 2424B to that first region. Collectively, steps 2424A and 2424B may be considered to be a first transformation. On the other hand, if the determination is negative, then a second region is defined 2426A and the output of output data is limited 2426B to that second region.

The output data is then outputted 2430. From the standpoint of a viewer, if the status of the contextual factor meets the standard (whether or not the viewer is aware of the contextual factor, the status thereof, and/or the standard), then the output data appears in one region, while if the status of the contextual factor does not meet the standard, the output data appears in another region. For example, data might be outputted to the viewer's central vision (e.g. on a head-mounted display) if the standard is met, and outputted to the viewer's peripheral vision if the standard is not met.

Figure 25:
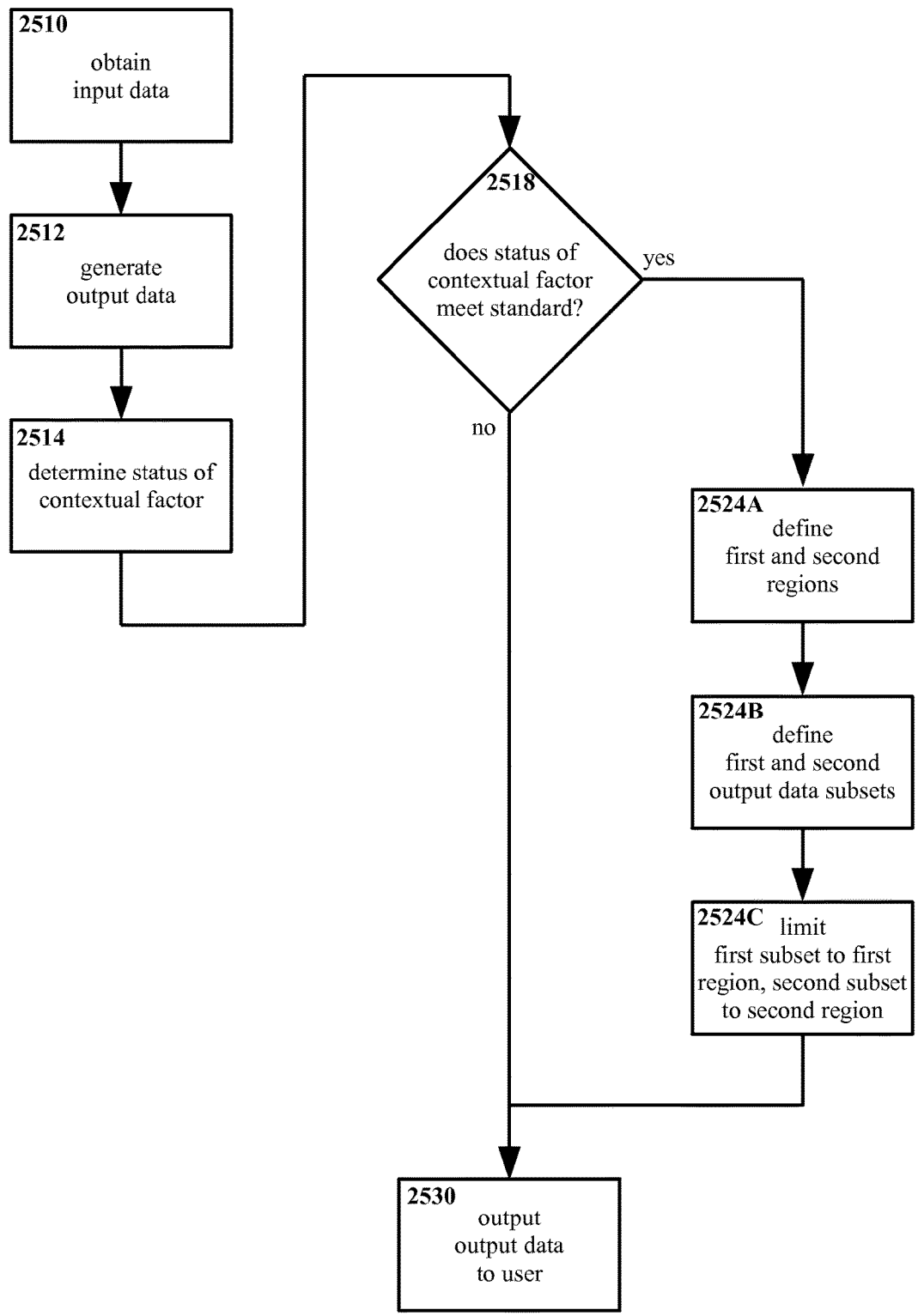
FIG. 25 an embodiment of a method for selectively outputting data to a viewer according to the present invention, transforming first and second subsets of output to first and second regions with a positive status.

Turning to FIG. 25, therein an example arrangement is shown wherein a first transformation splits data output into two distinct regions. In the method as shown in FIG. 25, input data is obtained 2510, output data is generated 2512, and a status of a contextual factor is determined 2514.

A determination is made 2518 as to whether the status of the contextual factor (as determined in step 2514) meets a standard for that contextual factor. If the determination 2518 is negative, the method proceeds to output the output data 2530.

However, if the determination is positive, several steps are executed. First and second regions are defined 2524A. First and second output data subsets also are defined 2524B. The output of both subsets is then limited 2524C, the first subset being limited to output in the first region, and the second subset being limited to output in the second region. The output data (rather, the first and second subsets thereof) is then outputted 2530.

As previously noted, subsets of the output data may include some or all of the full output data, and may or may not include additional data as well. Thus not all of the output data is necessarily outputted in either or both subsets; some portion of the output data may not be outputted at all in view of the transformation. In addition, since it is possible that the first and second subset may (depending on the transformation) include some of the same output data, some portion of the output data may be outputted twice (in both the first and the second subsets).

While the arrangement in FIG. 25 is somewhat similar to that in FIG. 24 in that both results in output data may appear in either of two defined regions, in the arrangement of FIG. 24 the output data either appears in a first region or a second region, while in the arrangement of FIG. 25 the output data is split into two subsets (assuming the status of the contextual factor is determined to meet the standard therefor, as shown) with one subset being outputted to a first region and another subset being outputted to a second region.

Figure 26:
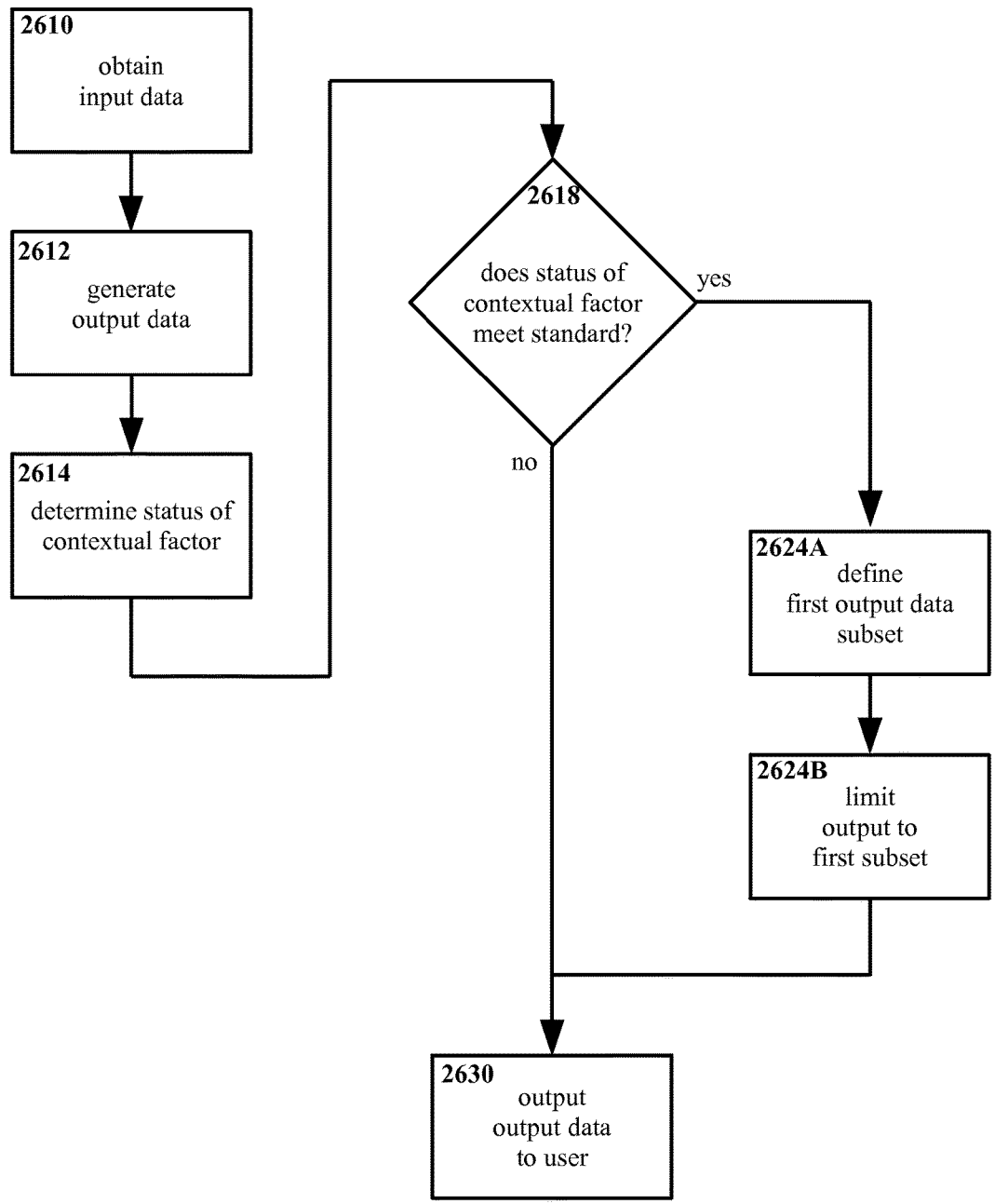
FIG. 26 an embodiment of a method for selectively outputting data to a viewer according to the present invention, limiting output to a first subset with a positive status.

Now with reference to FIG. 26, an example arrangement is shown therein with only a first subset of the output data being outputted. In the method as shown in FIG. 26, input data is obtained 2610, output data is generated 2612, and a status of a contextual factor is determined 2614.

A determination is made 2618 as to whether the status of the contextual factor (as determined in step 2614) meets a standard for that contextual factor. If the determination 2618 is negative, the method proceeds to output the output data 2630.

However, if the determination is positive, a first output data set is defined 2624A, and output of the output data is limited 2624B to that first subset. The output data (rather, the first subset thereof) is then outputted 2630.

Figure 27:
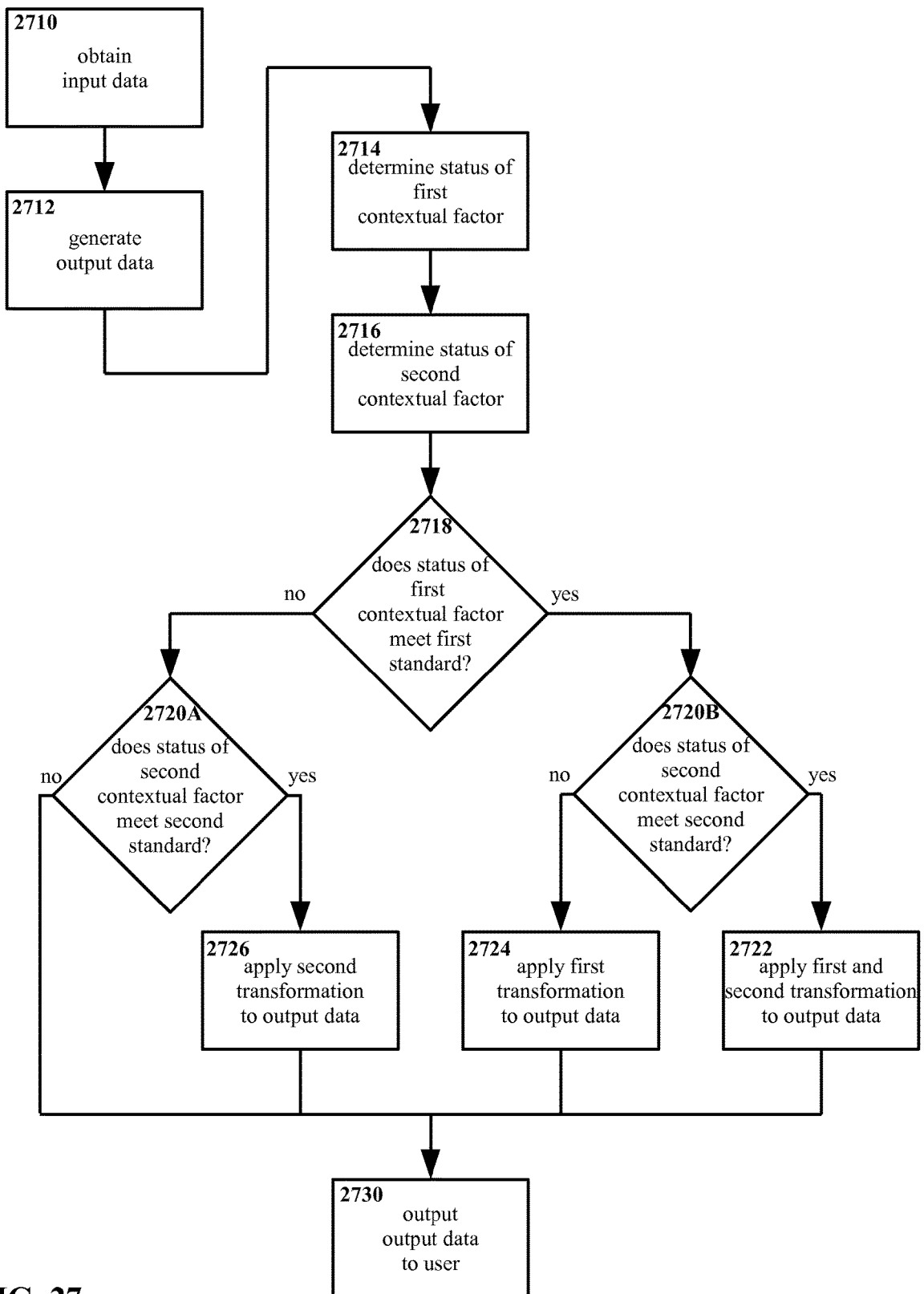
FIG. 27 an embodiment of a method for selectively outputting data to a viewer according to the present invention, showing equal precedence between first and second transformations.
Figure 28:
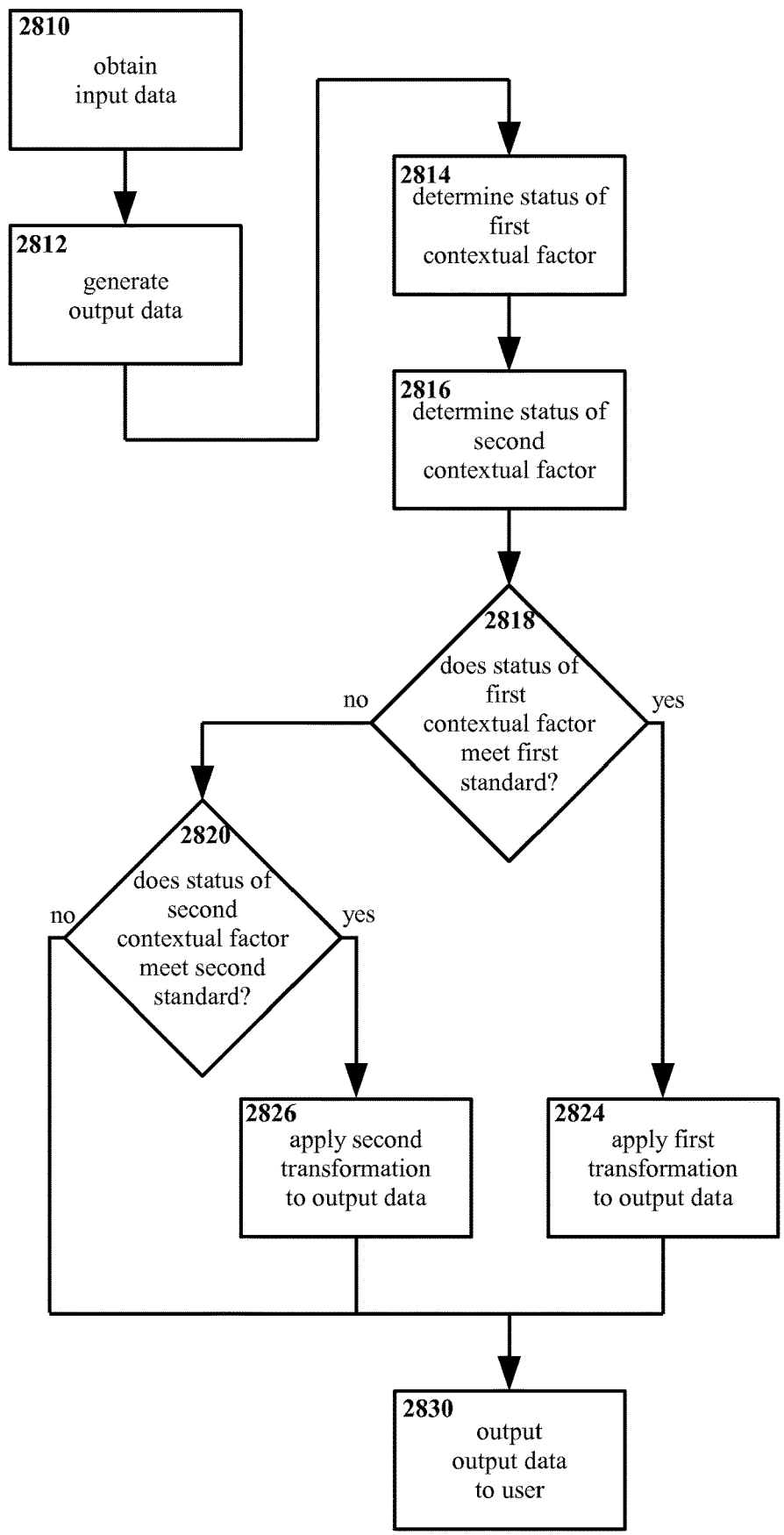
FIG. 28 an embodiment of a method for selectively outputting data to a viewer according to the present invention, showing a first transformation with full precedence over a second transformation.
Figure 29:
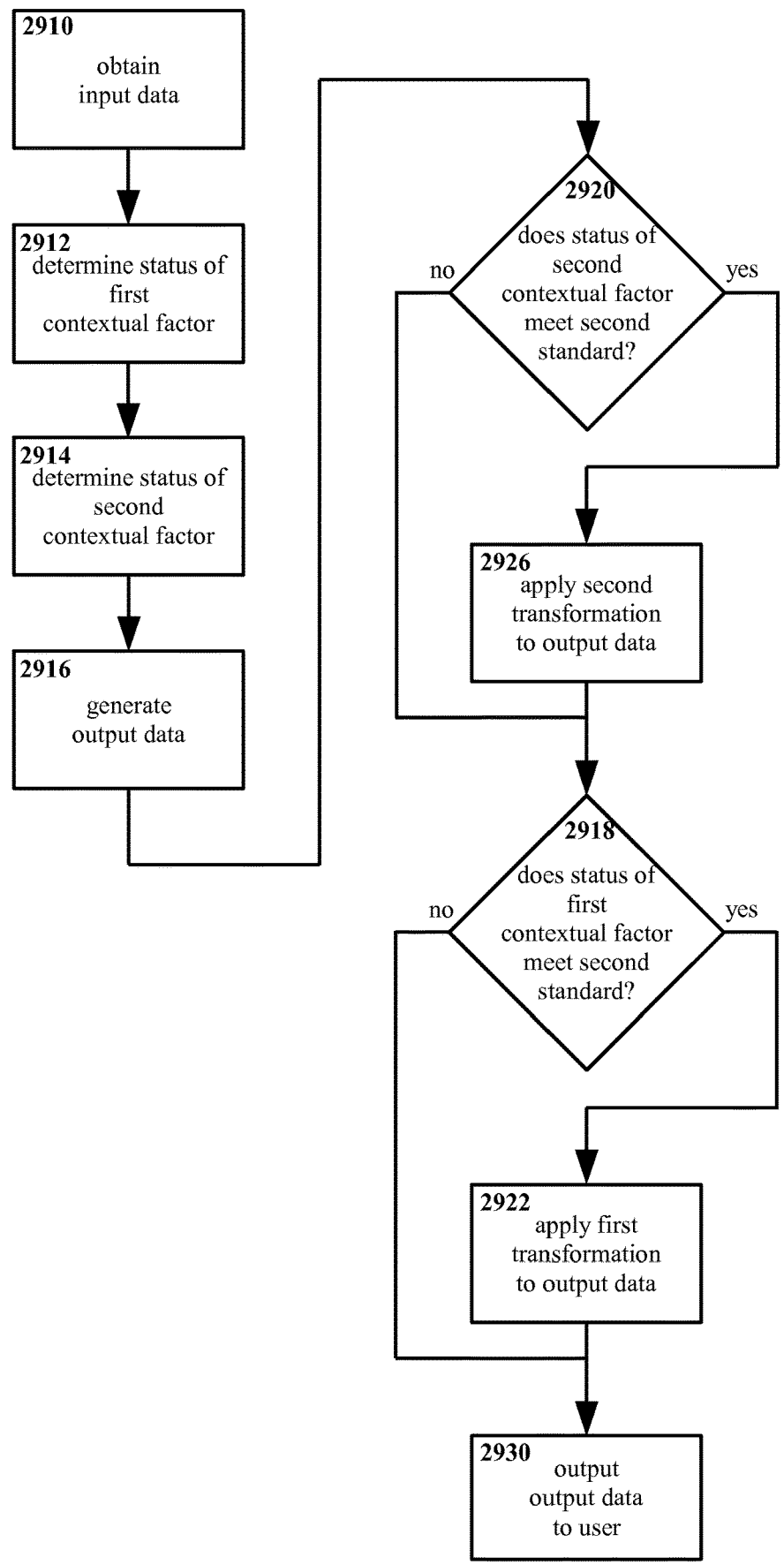
FIG. 29 an embodiment of a method for selectively outputting data to a viewer according to the present invention, showing a first transformation with partial precedence over a second transformation.

With regard to FIG. 27 through FIG. 29, as noted previously the present invention may include two or more contextual factors, status determinations, standards, and/or transformations invoked thereby. When two or more transformations are invoked, the relative precedence of the transformations may be significant. That is, if two transformations have the potential to produce different effects on the output data, some consideration may be useful in so far as which transformation(s) and/or which portions thereof are implemented. FIG. 27 through FIG. 29 present three examples of arrangements for managing multiple transformations, with each such figure showing an example wherein a different degree of precedence exists between the first and second transformations.

Now particularly with reference to FIG. 27, therein an example arrangement is shown wherein a first and second transformations have substantially equal precedence. In the method as shown in FIG. 27, input data is obtained 2710 and output data is generated 2712. A status of a first contextual factor is determined 2714, and the status of a second contextual factor is determined 2716.

A first determination is made 2718 as to whether the status of the first contextual factor (as determined in step 2714) meets the first standard. Regardless of whether the status first contextual factor is determined 2718 to meet the standard or not, a second determination is also made 2720A or 2720B as to whether the status of the second contextual factor (as determined in step 2716) meets the second standard. Thus, four paths are possible within the method as shown.

If the first determination 2718 is negative and the second determination 2720A is also negative, the method proceeds to output the output data 2730.

If the first determination 2718 is negative but the second determination 2720A is positive, a second transformation is applied 2726 to the output data, and the method then proceeds to output the output data 2730.

If the first determination 2718 is positive but the second determination 2720B is negative, a first transformation is applied 2724 to the output data, and the method then proceeds to output the output data 2730.

If the first determination 2718 is positive and the second determination 2720B is positive, both the first and second transformations are applied 2722 to the output data, and the method then proceeds to output the output data 2730.

As noted, for the arrangement in FIG. 27 the first and second transformations have substantially equal precedence. Thus, either or both transformations may be applied to and/or affect the output data.

Turning to FIG. 28, therein an example arrangement is shown with a first transformation having full precedence over a second transformation. In the method as shown in FIG. 28, input data is obtained 2810 and output data is generated 2812. A status of a first contextual factor is determined 2814, and the status of a second contextual factor is determined 2816.

A first determination is made 2818 as to whether the status of the first contextual factor (as determined in step 2814) meets the first standard. If the first determination is positive, a first transformation is applied 2824 to the output data. The output data is then outputted 2830. In such cases wherein the status of the first contextual factor meets the first standard, the status of the second contextual factor may not even be considered. In practice, for some embodiments the first determination 2818 as to whether the status of the first contextual factor meets the first standard may be made before the status of the second factor is determined 2816, since the outcome of the first determination may render the status of the second contextual factor moot.

If the first determination is negative, a second determination is made as to whether the status of the second contextual factor (as determined in step 2816) meets the second standard. If the second determination is also negative, the method proceeds to output the output data 2830. However, if the second determination is positive, a second transformation is applied to the output data 2826 before the output data is outputted.

As noted, for the arrangement in FIG. 28 the first transformation has full precedence over the second transformation. If the first transformation is executed, the second transformation is not executed.

Turning now to FIG. 29, therein an example arrangement is shown with a first transformation having partial precedence over a second transformation. In the method as shown in FIG. 29, input data is obtained 2910 and output data is generated 2912. A status of a first contextual factor is determined 2914, and the status of a second contextual factor is determined 2916.

A second determination is made 2920 as to whether the status of the second contextual factor (as determined in step 2916) meets the second standard. If the second determination is positive, a second transformation is applied 2926 to the output data. If the second determination is negative, the second transformation is not applied. In either event, a first determination is also made 2918 as to whether the status of the first contextual factor (as determined in step 2914) meets the first standard. If the first determination is positive, a first transformation is applied 2922 to the output data (as potentially already transformed by the second transformation). If the first determination is negative, the first transformation is not applied. In any event, the method proceeds to output the output data 2930.

As illustrated and described in FIG. 29, the second determination and/or the second transformation may take place before the first determination and/or the first transformation. This is presented as an example only for purposes of illustrating precedence and does not necessarily imply a strict chronology. The chronological order of the first and second transformations is not necessarily significant in itself. Rather, because the first transformation has partial precedence over the second transformation, the first transformation is able to partially or completely undo, counter, and/or override the second transformation, and/or to limit the second transformation, should a conflict between the first and second transformations exist.

Figure 34:
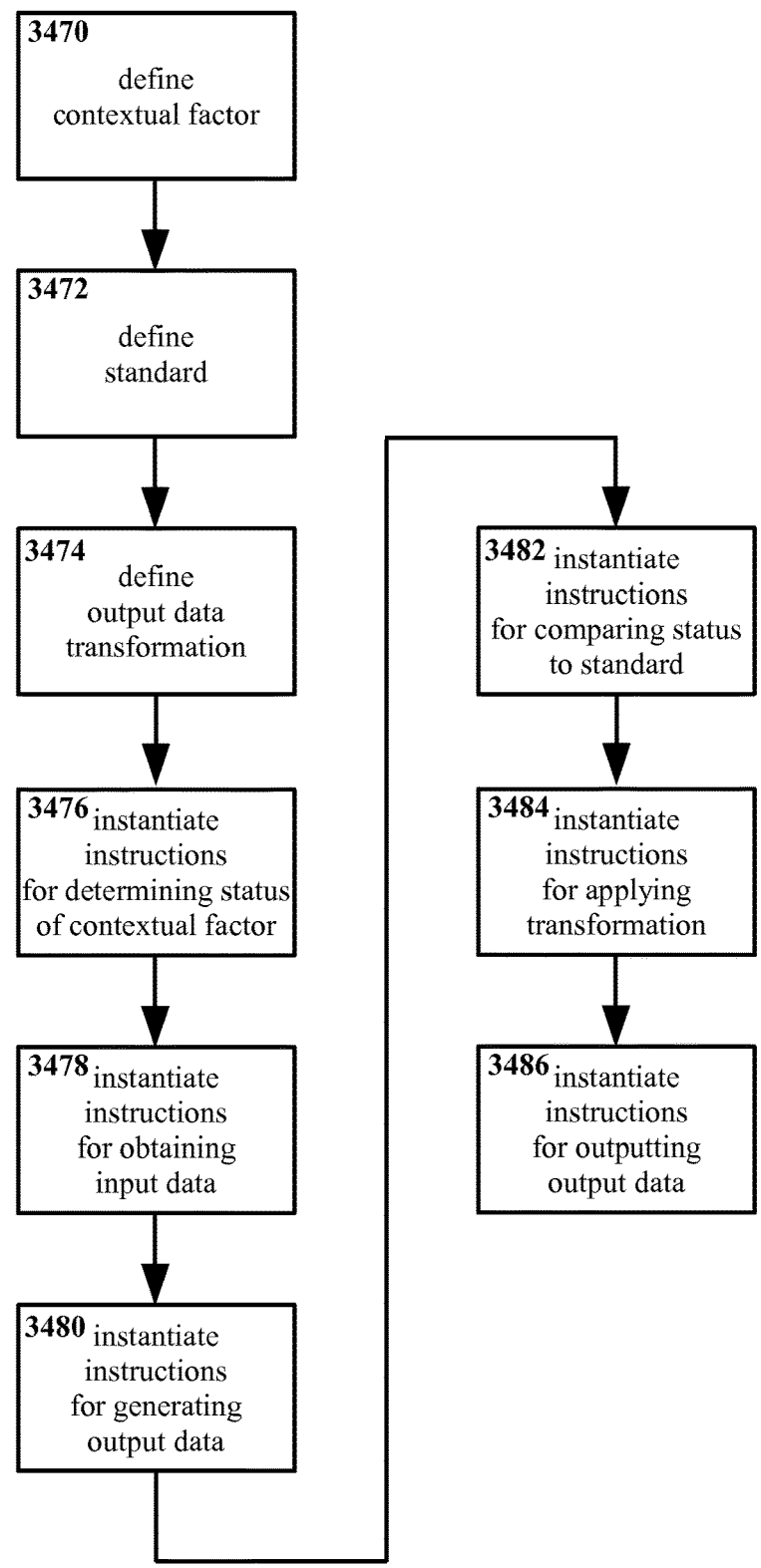
FIG. 34 shows an arrangement for establishing in a processor an example embodiment of a method for selectively outputting data to a viewer according to the present invention.

With reference now to FIG. 34, an example embodiment of a method according to the present invention is shown. As noted, at least some embodiments of the present invention are machine-controlled methods. In the example embodiment of FIG. 34, an arrangement is shown wherein a method is established within a processor, for executing a method for selectively presenting content according to the present invention.

In the method of FIG. 34, a contextual factor is defined 3470. The source of the contextual factor is not particularly limited. The contextual factor may, for example, be viewer-defined, may be determined by a controlling processor, may be read from a data store, may be received from an external source, etc. Other arrangements may be equally suitable. The nature of the contextual factor also is not particularly limited.

A standard for the contextual factor also is defined 3472. As with the contextual factor, the source of the standard therefor is not particularly limited. The standard may, for example, be viewer-defined, may be determined by a controlling processor, may be read from a data store, may be received from an external source, etc. Other arrangements may be equally suitable. The nature of the standard also is not particularly limited.

In addition, a transformation for output data is defined 3474. Again, the source of the transformation is not particularly limited. The transformation may, for example, be viewer-defined, may be determined by a controlling processor, may be read from a data store, may be received from an external source, etc. Other arrangements may be equally suitable. The nature of the transformation also is not particularly limited.

Executable instructions for determining the status of the contextual factor are instantiated 3476 onto a controlling processor. The manner by which the determination is made is not particularly limited, nor are the executable instructions therefor.

Executable instructions for obtaining input data are instantiated 3478 onto the controlling processor. The source for obtaining the input data is not particularly limited, nor is the manner of obtaining the input data, nor are the executable instructions therefor. For some embodiments, the executable instructions may cause the controlling processor to obtain input data from one or more sensors, to generate input data internally, to read input data from a data store, to receive input data from an external source, etc. Other arrangements may be equally suitable.

Executable instructions for generating output data, e.g. from the input data, are instantiated 3480 onto the controlling processor. The manner by which the output data is generated is not particularly limited, nor are the executable instructions therefor.

Executable instructions for comparing the status of the contextual factor with the standard defined therefor (in step 3472) are instantiated 3482 onto the controlling processor. The manner of comparison and the instructions therefor are not particularly limited.

Executable instructions for applying the transformation (defined in step 3474) to the output data are instantiated 3484 onto the controlling processor, with the transformation being contingent on whether the status of the contextual factor meets the standard therefor. The manner of executing the transformation is not particularly limited.

Executable instructions for outputting the output data (whether or not the transformation is applied thereto) are instantiated 3486 onto the controlling processor. The manner of outputting the output data is not particularly limited.

Figure 30:
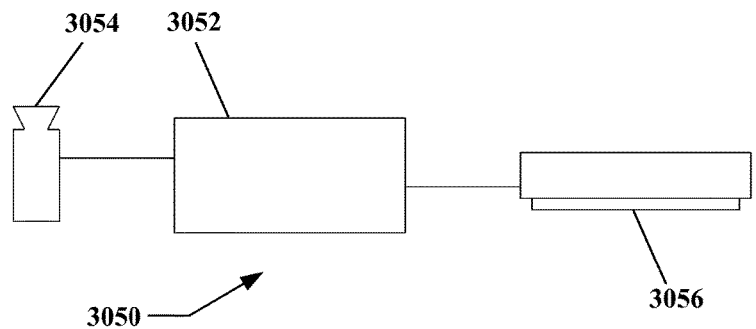
FIG. 30 shows an embodiment of an apparatus for selectively output data to a viewer according to the present invention.

With reference now to FIG. 30, an embodiment of an apparatus 3050 for selectively presenting content is shown. The example apparatus as illustrated includes a processor 3052, a sensor 3054 in communication with the processor 3052, and a display 3056 in communication with the processor 3052.

The sensor 3054 is adapted to sense at least one contextual factor. The sensor 3054 may be, but is not required to be, adapted to generate some or all input data (if any) used by the processor 3052.

The processor 3052 is adapted to determine a status of the contextual factor as sensed by the sensor 3054. The processor 3052 is also adapted to determine if the contextual factor meets a standard. The processor 3052 is further adapted to generate output data, e.g. from input data supplied thereto, and to apply a transformation to the output data if the contextual factor meets the standard.

The display 3056 is adapted to output the output data to a viewer.

A range of devices may be suitable for use as the sensor 3054. As illustrated in FIG. 30, the sensor 3054 is shown as an imaging sensor such as a camera, adapted to capture images and/or video. A range of cameras, including but not limited to CMOS and CCD cameras, may be suitable. However, the use of a camera or other imaging sensor as a sensor 3054 for the apparatus 3050 is an example only. Other sensors may be equally suitable, such as sensors that capture information other than images and/or video may be equally suitable. Other suitable sensors 3054 may include but are not limited to position sensors, motion sensors, acceleration sensors, and biometric sensors. More particular sensors 3054 may include but are not limited to accelerometers, gyroscopes, compasses, GPS sensors, and differential GPS sensors.

The sensor 3054 is not particularly limited with regard to either what precise context factor(s) may be sensed, or how the sensor 3054 may sense the contextual factor(s).

Similarly, a range of general-purpose, special-purpose, and embedded systems may be suitable for use as the processor 3052. Moreover, it may be equally suitable for the processor 3052 to consist of two or more physical or logical processor components.

A range of devices likewise may be suitable for use as the display 3056, including but not limited to light emitting diodes (LED), organic light emitting diodes (OLED), plasma screen panels (PDP), liquid crystal displays (LCD), etc. Likewise, the use of projected or transmitted displays, where the viewed surface (if any) is essentially a passive screen for an image projected or otherwise transmitted after being generated elsewhere, may also be suitable. Other arrangements including but not limited to systems that display images directly onto a viewer's eyes also may also be suitable. Either digital or analog display technologies may be suitable.

The apparatus may vary considerably from one embodiment to another, in ways including but not limited to the following.

Figure 31:
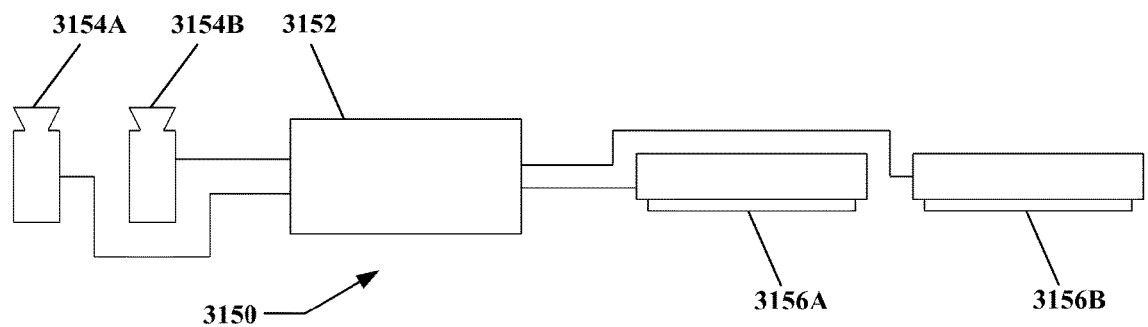
FIG. 31 shows an embodiment of an apparatus for selectively output data to a viewer according to the present invention, with stereo sensors and stereo displays.

Turning to FIG. 31, an example apparatus 3150 is shown having stereo sensors 3154A and 3154B, adapted to generate stereo information, in communication with a processor 3152. Such a sensor arrangement may be useful for at least some embodiments, at least in that stereo imaging can provide three-dimensional data regarding an environment, e.g. by capturing images (or other data) from slightly different perspectives so as to provide distance information, etc. However, the use of stereo sensors 3154A and 3154B is an example only, and other arrangements may be equally suitable.

The apparatus 3150 also includes stereo displays 3156A and 3156B, adapted to output stereo output data, in communication with the processor 3152. Such a display arrangement may be useful for at least some embodiments, at least in that stereo output can display three-dimensional data to a viewer, e.g. by outputting slightly different perspectives to left and right displays 3156A and 3156B (and thus to left and right eyes). However, the use of stereo displays 3156A and 3156B is an example only, and other arrangements may be equally suitable.

Figure 32:
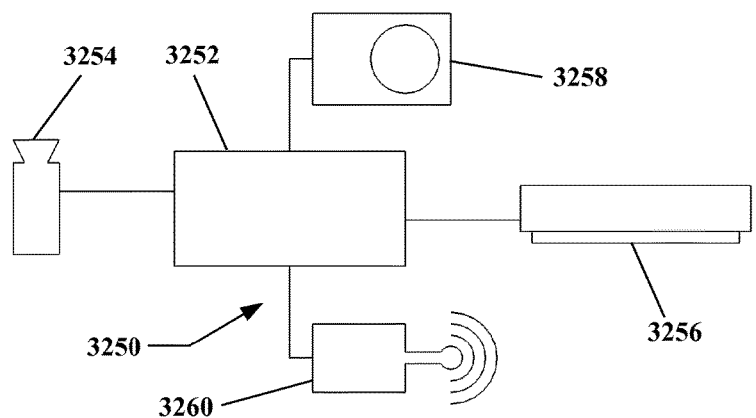
FIG. 32 shows an embodiment of an apparatus for selectively output data to a viewer according to the present invention, with a data store and communicator.

With reference now to FIG. 32, an apparatus 3250 is shown having a processor 3252, a sensor 3254, and a display 3256, at least somewhat similar to FIG. 30. However, the example apparatus in FIG. 32 also includes a data store 3258 in communication with the processor 3252. The data store 3258 is adapted to store input data and/or to store information regarding the status of one or more contextual factors, and to communicate such information with the processor 3252.

A variety of devices may be suitable for use as the data store 3258. Suitable devices may include but are not limited to magnetic hard drives, optical drives, and solid state drives. Other devices and/or systems may be equally suitable.

The apparatus 3250 also includes a communicator 3260 in communication with the processor 3252. The communicator 3260 is adapted to receive input data and/or information regarding the status of one or more contextual factors from some source external to the apparatus 3250. The communicator 3260 also may be, but is not required to be, adapted to transmit information to some destination external to the apparatus 3250.

A variety of devices also may be suitable for use as the communicator 3258. Communication may be wired and/or wireless. Suitable devices may include but are not limited to wired and wireless modems.

As noted above with regard to the individual elements, any or all of a sensor, a data store, and/or a communicator may provide input data and/or information regarding contextual factors to a processor in an apparatus according to the present invention. Thus, arrangements with only a sensor, only a data store, and/or only a communicator may be suitable for at least some embodiments. However, combinations of one or more sensors, one or more data stores, and/or one or more communicators also may be suitable, and the present invention is not particularly limited with respect thereto.

Figure 33:
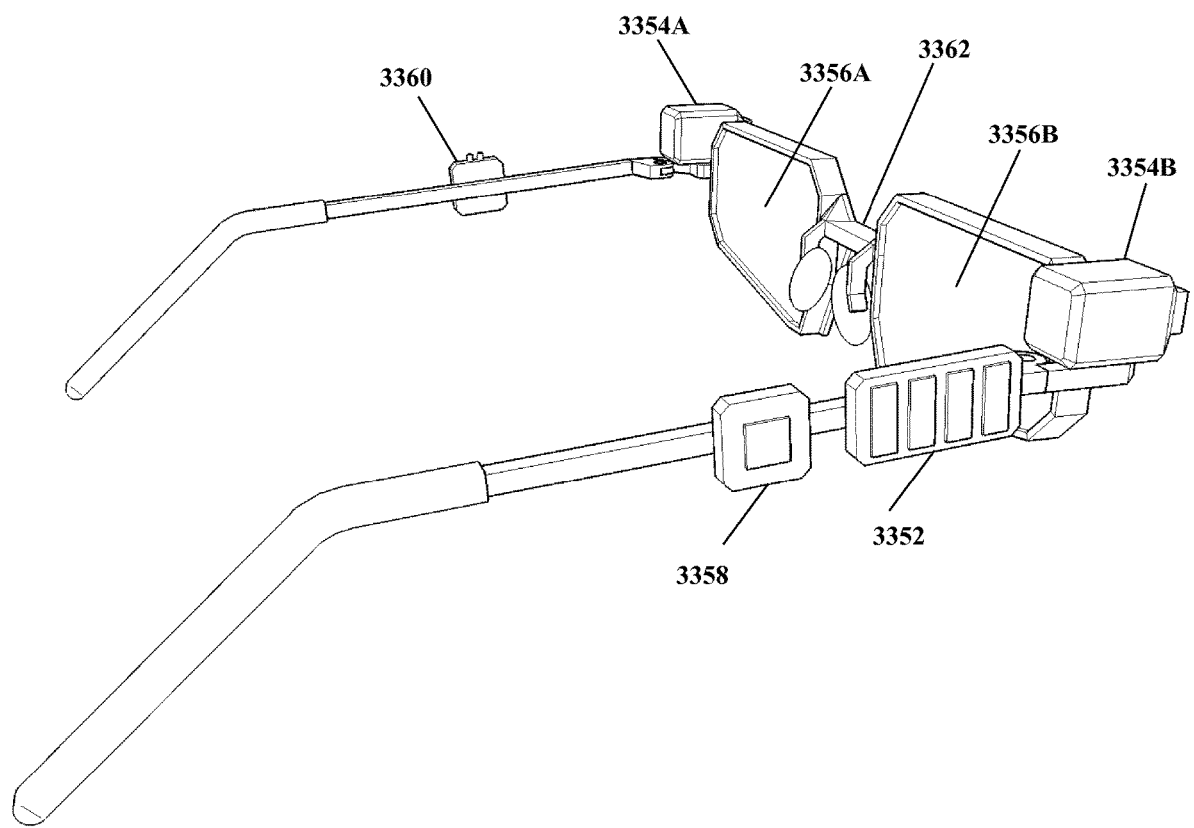
FIG. 33 shows an embodiment of an apparatus for selectively output data to a viewer according to the present invention, in the form of a head-mounted display.

The present invention may be incorporated into and/or utilized with a broad range of other devices. For example, FIG. 33 shows an arrangement of an apparatus 3350 in accordance with the present invention as incorporated with a head-mounted display. The embodiment shown in FIG. 33 includes a processor 3352, first and second sensors 3354A and 3354B in a stereo arrangement, and first and second displays 3356A and 3356B also in a stereo arrangement. The apparatus 3350 also includes a data store 3358 and a communicator 3360.

The apparatus shown in FIG. 33 also includes a body 3362 in the form of a frame for a head-mounted display. As shown the body 3362 resembles a pair of glasses, but this is an example only, and other configurations may be equally suitable.

As may be seen, the first and second sensors 3354A and 3354B are disposed so as to be generally forward-facing similarly to a viewer's eyes. Typically, although not necessarily, the first and second sensors 3354A and 3354B will have imaging fields of view at least sufficient so as to substantially encompass the visual field of a viewer. While the imaging fields of view of the first and second sensors 3354A and 3354B may potentially extend beyond the visual field of the viewer, with sufficiently large angles of view for the first and second sensors 3354A and 3354B the images obtained therefrom will at least include imaging fields of view substantially corresponding the with a viewer's visual field. However, such an arrangement is an example only, and other arrangements may be equally suitable.

The displays 3356A and 3356B are engaged with the body 3362, with the body 3362 being configured and the displays 3356A and 3356B being disposed such that when viewer wears the apparatus 3350, the displays 3356A and 3356B are disposed proximate to and substantially aligned with the viewer's eyes. The sensors 3354A and 3354B are engaged with the body 3362, as are the processor 3352, the data store 3358, and the communicator 3360.

Although as shown in FIG. 33 the sensors 3354A and 3354B are engaged with the body 3362 such that both sensors 3354A and 3354B face generally away from the viewer when the viewer wears the apparatus 3350, this is an example only and is not required. Arrangements wherein one or more sensors are disposed so as to face toward the viewer, and/or are in direct contact with the viewer, may be equally suitable.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. A method, comprising:
   determining, by a processing device, a position of an eye with respect to a display;
   defining, by the processing device, a first region of the display substantially corresponding with a peripheral vision field of the eye;
   defining, by the processing device, a second region of the display substantially corresponding with a central visual field of the eye;
   displaying, by the display, a first portion of a virtual object at the first region;
   displaying, by the display, a second portion of the virtual object at the second region such that a portion of the central visual field is unobstructed by the second portion of the virtual object;
   identifying, by the processing device, a change in the position of the eye;
   adjusting, by the processing device, a correspondence between the second region and the central visual field of the eye in view of the change in the position of the eye to obtain an adjusted second region; and
   displaying, by the display, the second portion of the virtual object at the adjusted second region.

2. The method of claim 1, wherein the display is a see-through display such that a real-world object is viewable through the display.

3. The method of claim 1, wherein the second portion of the virtual object displayed at the adjusted second region continues to be unobstructed by the second portion of the virtual object.

4. The method of claim 1, wherein:
   the display is a head-mounted display; and
   the unobstructed portion of the second region allows a user to view the virtual object while providing a view of the central visual field such that the user is able to see while walking, jogging, running, or exercising.

5. The method of claim 1, comprising:
   determining that a movement of a user exceeds a minimum level; and
   in response to the movement being at the minimum level, restricting the display of the virtual object at the first region.

6. The method of claim 5, wherein the movement of the user exceeding the minimum level is indicative of the user walking, jogging, running, exercising, operating a vehicle, or operating machinery.

7. The method of claim 1, comprising:
   determining that a movement of a user is below a minimum level; and
   in response to the movement being below the minimum level, displaying the virtual object at the first region.

8. The method of claim 5, wherein the movement of the user being below the minimum level is indicative of the user sleeping, sitting, standing, or conversing.

9. The method of claim 1, comprising:
   determining that a light level of an environment approximate the user exceeds a minimum level; and
   in response to the light level being at the minimum level, restricting the display of the virtual object at the first region.

10. The method of claim 1, comprising:
    determining that a change in light level of an environment approximate a user; and
    in response to the light level being at a minimum level, restricting the display of the virtual object at the first region.

11. The method of claim 10, wherein the change in the light level is indicative of a light flashing to indicate a presence of an emergency or hazard.

12. The method of claim 1, comprising:
    determining that a light level of a user is below a minimum level; and
    in response to the light level being below the minimum level, displaying the virtual object at the first region.

13. The method of claim 1, wherein the central visual field is circular.

14. The method of claim 1, wherein:
    the central visual field comprises a macular portion, a foveal portion, and a foveolar portion; and
    the portion of the central visual field that is unobstructed is one of the macular portion, the foveal portion, or the foveolar portion.

15. An apparatus, comprising:
    a display configured to display a virtual object; and
    a processing device coupled to the display, wherein the processing device is configured to:
      determine a position of an eye of a viewer with respect to the display;
      define a first region of the display substantially corresponding with a peripheral vision field of the eye;
      define a second region of the display substantially corresponding with a central visual field of the eye;
      display, via the display, first data representative of a first portion of the virtual object at the first region; and
      display, via the display, second data representative a second portion of the virtual object at the second region such that a portion of the central visual field is unobstructed by the second portion of the virtual object.

16. The apparatus of claim 15, wherein the processing device is configured to:
    receive data indicating a movement of a body of the viewer from a first location to a second location;
    determine that the movement is below a threshold distance; and
    display the virtual object such that the central visual field is obstructed by the second portion of the virtual object.

17. The apparatus of claim 15, wherein the processing device is configured to:
    receive data indicating a movement of a body of the viewer from a first location to a second location;
    determine that the movement exceeds a threshold distance; and
    display the virtual object such that the central visual field is unobstructed by the second portion of the virtual object while the body is moving from the first location to the second location.

18. A device, comprising:
    a display configured to display data; and
    a processing device coupled to the display, wherein the processing device is configured to:
      determine a position of an eye of a viewer with respect to the display;
      define a first region of the display substantially corresponding with a peripheral vision field of the eye;
      define a second region of the display substantially corresponding with a central visual field of the eye;
      send, to the display, a first portion of the data to be displayed at the first region; and send, to the display, a second portion of the data to be displayed at the second region such that a portion of the central visual field is unobstructed by the second portion of the data.

19. The device of claim 18, wherein the processing device is configured to:
receive data indicating a movement of a body of the viewer from a first location to a second location;
determine whether the movement exceeds a threshold distance;
in response to the movement exceeding the threshold distance, display the second portion of the data such that the central visual field is obstructed by the second portion of the data while the body is moving from the first location to the second location; and
in response to the movement being below the threshold distance, display the second portion of the data such that the central visual field is unobstructed by the second portion of the data while the body is moving from the first location to the second location.

20. The device of claim 18, wherein the data is at least one of a virtual object or a text object.

\* \* \* \* \*